(12) United States Patent
Iwanski et al.

(10) Patent No.: US 9,059,962 B2
(45) Date of Patent: Jun. 16, 2015

(54) SECURE ACCESS TO APPLICATIONS BEHIND FIREWALL

(71) Applicants: Jerry S. Iwanski, Toronto (CA); Yamian Quintero Cantero, Toronto (CA)

(72) Inventors: Jerry S. Iwanski, Toronto (CA); Yamian Quintero Cantero, Toronto (CA)

(73) Assignee: Route1 Inc., Toronto, Ontario (CA)

( * ) Notice: Subject to any disclaimer, the term of this patent is extended or adjusted under 35 U.S.C. 154(b) by 94 days.

(21) Appl. No.: 13/802,573

(22) Filed: Mar. 13, 2013

(65) Prior Publication Data

US 2014/0282999 A1    Sep. 18, 2014

(51) Int. Cl.
    *H04L 29/06*    (2006.01)
(52) U.S. Cl.
    CPC ............... *H04L 63/02* (2013.01); *H04L 63/101* (2013.01)
(58) Field of Classification Search
    None
    See application file for complete search history.

(56) References Cited

U.S. PATENT DOCUMENTS

| 2002/0091775 | A1* | 7/2002 | Morehead et al. | 709/206 |
| 2005/0114712 | A1* | 5/2005 | Devine et al. | 713/201 |
| 2009/0049156 | A1* | 2/2009 | Aronsson et al. | 709/219 |
| 2011/0016312 | A1* | 1/2011 | Iwanski et al. | 713/156 |
| 2013/0298215 | A1* | 11/2013 | Kuznetsov et al. | 726/8 |

* cited by examiner

*Primary Examiner* — Justin T Darrow
*Assistant Examiner* — Andrew Steinle
(74) *Attorney, Agent, or Firm* — Brenda Pomerance

(57) ABSTRACT

A user having remote device wants to access an application executing on an application server computer that is behind a firewall. During set-up, another firewall and a gateway computer are configured in front of the original firewall. During registration, users' remote devices are configured with security data. The security data includes user authentication cryptographic credentials, for establishing secure channels, and may include user application cryptographic credentials as needed by individual applications executing on the application server. During operation, the user provides a password to an application program executing on his/her remote device to use the security information on the remote device to establish a secure channel to the application, and then conducts a data session with the application. If the application needs to verify the identity of the user, the user's remote device performs a cryptographic operation using the user application cryptographic credentials, and sends the result to the application.

19 Claims, 33 Drawing Sheets

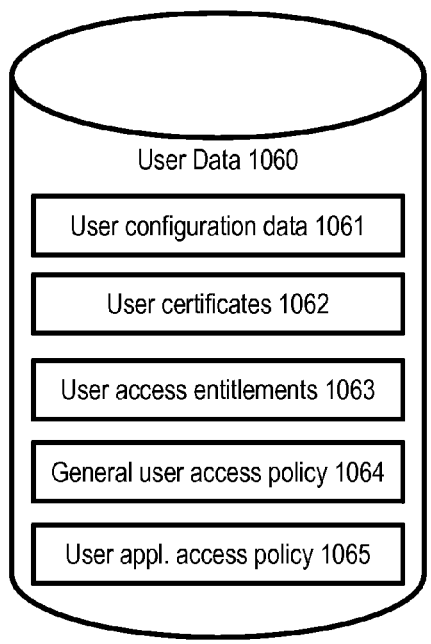
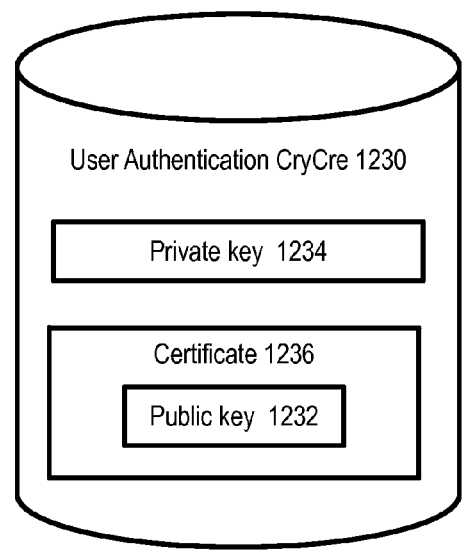
Fig. 2B                    Fig. 2C

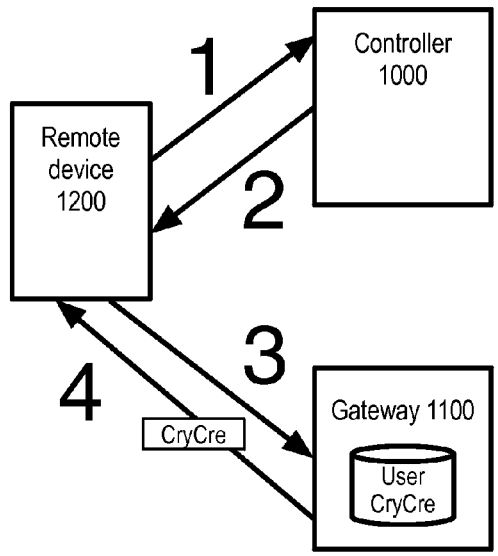
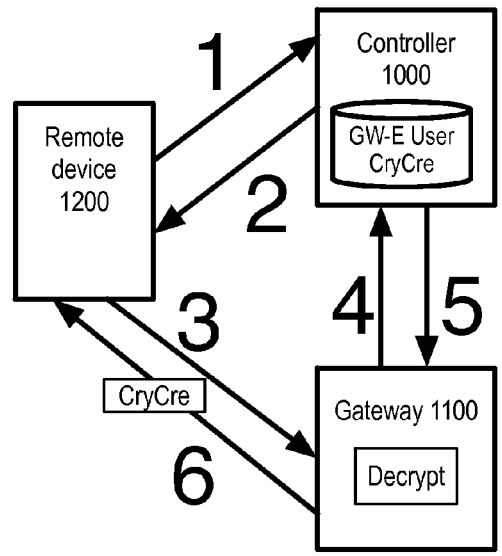
Fig. 3I    Fig. 3J
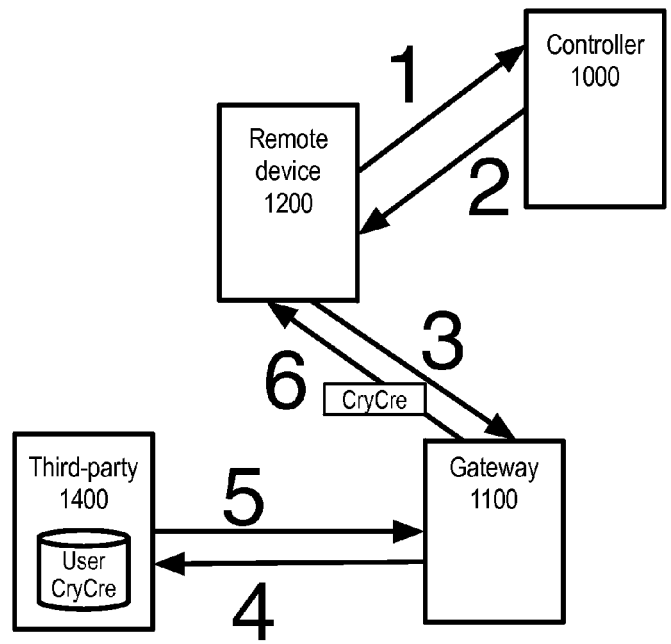
Fig. 3K

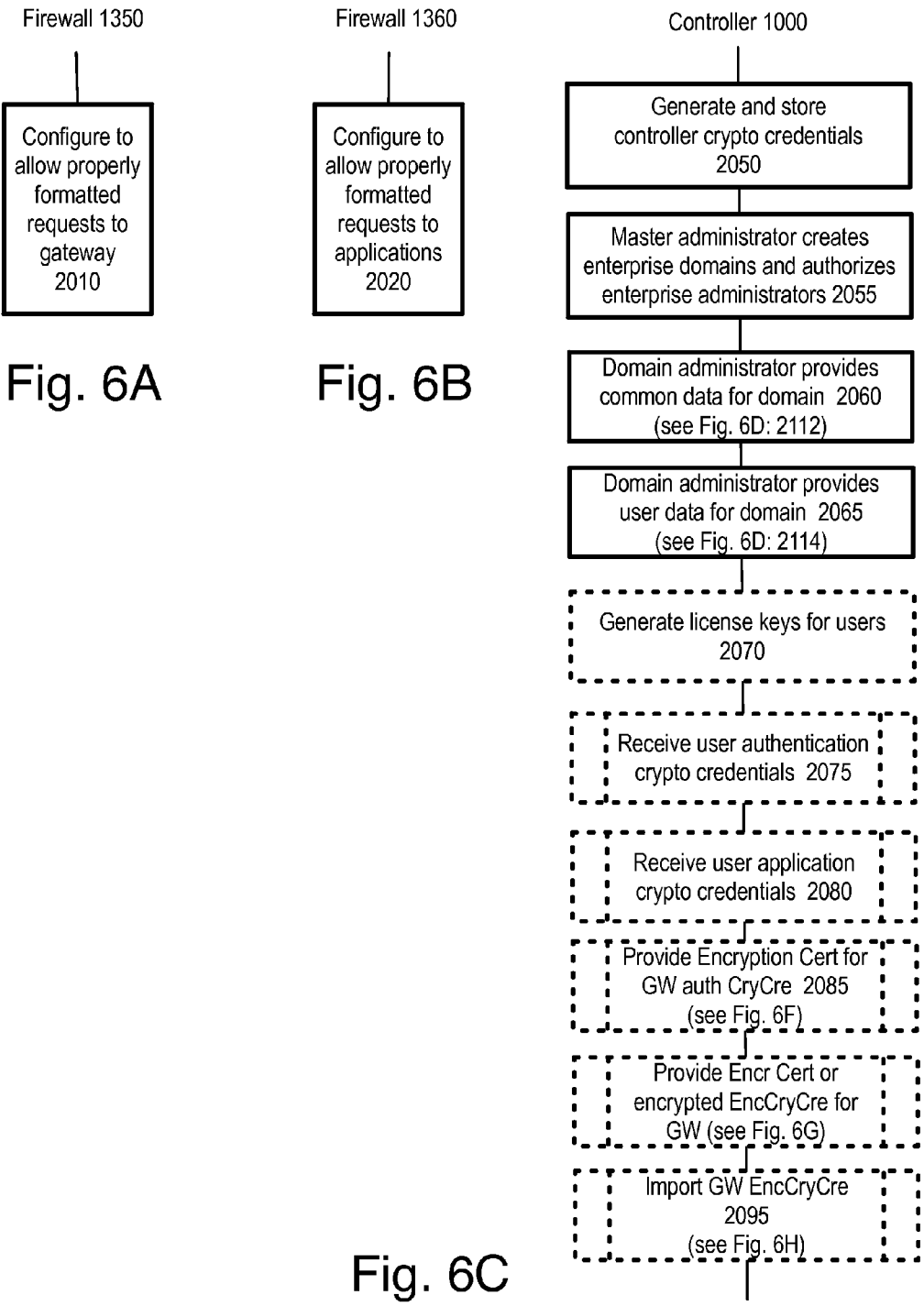

SECURE ACCESS TO APPLICATIONS BEHIND FIREWALL

BACKGROUND OF THE INVENTION

The present invention relates to enabling a user having a remote device to access applications executing on an application server.

It is desirable that a remote user of an organization's computer applications be able to connect to these applications using a public communication network, such as the Internet. It is also desirable that an organization's computers not be exposed to unauthorized access from the public communication network, such as by hackers. It is further desirable that security measures, such as authorizing access to potential users, occur in a separate device from the host computer to strongly isolate the host computer and the authorization module from malicious users.

One way to allow remote connectivity is for the organization to establish a virtual private network (VPN) using the public communication network. However, a VPN is complex to manage, and so is burdensome for an enterprise. Also, a VPN may make the internal enterprise network vulnerable to computer viruses and other malware.

Another way to allow remote connectivity is for the organization to set up a web-page allowing the remote user to log-in. If non-encrypted, the information exchanged between the web server and the remote user is unsecured. Whether or not encrypted, the web server is vulnerable to attacks, such as distributed denial of service attacks. If encrypted, and a strong authentication of the client is desired, both the web server and the remote user need to have cryptographic certificates, introducing a certificate management burden.

A further way to allow remote connectivity is described in U.S. Pat. No. 7,814,216, which is commonly owned with the instant application, the disclosure of which is hereby incorporated by reference in its entirety. The '216 patent discloses that a remote device, a controller, and a host computer are all connected to a public communication network. The remote device uses a special software program, adapted to use public key infrastructure (PKI) security certificates, to access the controller, and tells the controller which host it wishes to connect to. The controller verifies the remote, and then tells the host computer to send a connection request to the remote device. After the remote device accepts the connection request, the controller is no longer involved, unless the connection is undesirably broken.

U.S. Pat. No. 7,739,726, which is commonly owned with the instant application, the disclosure of which is hereby incorporated by reference in its entirety, discloses a "memory stick" device that contains the special software program, and is inserted into a USB port, or similar connector, of a computer to enable the computer to function as the remote device in the configuration of the '216 patent.

Yet another way to allow remote connectivity is described in U.S. Patent Application Publication No. 2005/0120204 (Kiwimagi). FIG. 2 of Kiwimagi is reproduced as FIG. 1A of the instant application, and shows a public communication network having connected thereto security host 210, remote client 220, and system host 230.

During registration, shown in FIGS. 3(a) and 4 of Kiwimagi, corresponding to FIG. 1B of the instant application, remote client 220 contacts security host 210 and requests the network address of system host 230. After verification of remote client 220, security host 210 provides the network address of system host 230 to remote client 220.

During operation, shown in FIGS. 3(b) and 4 of Kiwimagi, corresponding to FIG. 1C of the instant application, remote client 220 sends a connection request to system host 230. In turn, system host 230 asks security host 210 to verify remote client 220. After security host 210 verifies remote client 220, system host 230 grants access to remote client 220, and remote client 220 then uses system host 230.

Problems with Kiwimagi's technique are discussed below.

Application programs that require user to computationally verify their identity generally assume that a user has cryptographic data that has been provided only to that user, and then expect the user to perform a computation using that cryptographic data to provide a result, which will verify the identity of the user, as only the user with the particular cryptographic data will be able to properly compute the result. However, managing the distribution and revocation of such cryptographic information is burdensome for an enterprise, particularly if the enterprise uses different applications that each require different cryptographic data for each user.

Accordingly, there is room for an improved way for a remote device to access a host computer.

SUMMARY OF THE INVENTION

In accordance with an aspect of this invention, there is provided a method of enabling use of an application program, comprising receiving, at a controller computer, a request from a user of a remote device for application entitlement. The controller computer sends to the remote device a list of application programs that the user of the remote device is entitled to use, and network addresses of gateway computers respectively associated with the application programs. One of the gateway computers receives a request from the user of the remote device for use of a selected application program. The gateway computer sends to the controller computer a request for verification that the user of the remote device is entitled to use the selected application program, and receives a response from the controller computer indicating that the user of the remote device is entitled to use the selected application program. The gateway computer establishes a secure channel to the selected application program executing on a computer other than the gateway computer or the controller computer. The gateway computer receives data from the selected application program, and automatically sends the data from the selected application program to the remote device. The gateway computer receives data from the remote device, and automatically sends the data from the remote device to the application program using the secure channel.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 2B-2C are charts showing data organization;

FIGS. 3A-3K are diagrams showing different techniques for distributing security data;

FIGS. 6A-6H are flowcharts respectively showing set-up procedures for the configurations of the instant invention;

DETAILED DESCRIPTION

A user having remote device wants to access an application executing on an application server computer that is behind a firewall. During a set-up phase, another firewall and a gateway computer are configured in front of the original firewall, creating a demilitarized zone (DMZ) having the gateway computer. During a registration phase, users' remote devices are configured with security data.

After set-up and registration, i.e., during operation, the user provides a password to an application program executing on his/her remote device. The password enables use of the security information on the remote device.

In one embodiment, the user now accesses an application through a conventional method, such as a non-secure channel, and when the application requires use of the security information on the remote device, the user is able to respond properly.

In another embodiment, the user uses the security information to establish a secure channel to the application, and then conducts a data session with the application.

Figure 2A:
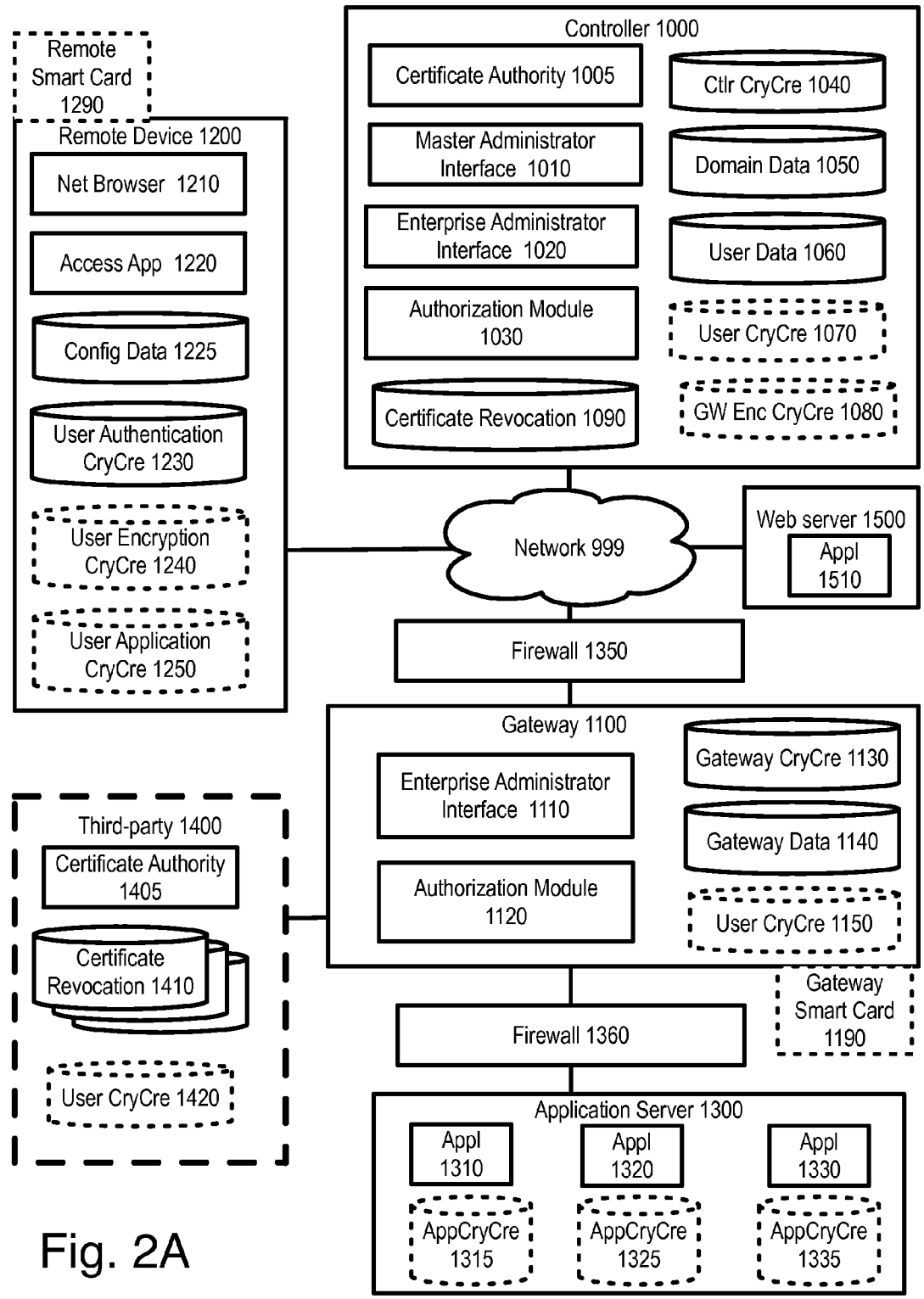
FIG. 2A is a block diagram showing hardware and communication configurations for the instant invention.

FIGS. 2A-2C are sometimes collectively referred to as FIG. 2.

FIG. 2A is a block diagram showing hardware and communication configurations for the instant invention. Network 999 is a public communication network, such as the Internet. Controller 1000, remote device 1200, firewall 1350 and web server 1500 are each coupled to the Internet via suitable wireline or wireless communication channel. Firewall 1350 is coupled to gateway 1100 that is coupled to firewall 1360 that is coupled to application server 1300. Gateway 1100 may be coupled to third-party 1400. There is only one instance of controller 1000 in this configuration. There is at least one instance of remote device 1200, and at least one instance of firewall 1350.

In the figures, a dotted line usually indicates an optional item.

Generally, controller 1000 is operated by a service provider different than the enterprises that want their remote users to securely use the enterprise application programs. The enterprise administrator, sometimes referred to as a domain administrator, typically prefers to store as little as possible on the controller due to the enterprise security policy. Because the gateway is located at the premises of the enterprise, it is under the physical control of the enterprise and so the enterprise administrator is usually more comfortable with managing from the gateway and storing information at the gateway. However, if the enterprise has multiple gateways, storing certain information at the controller is efficient, as it provides a single point from which to manage security information with a uniform interface even if the originators of the security information use different techniques.

As used herein and in the claims, "cryptographic credentials" ("CryCre") comprises a private key and corresponding cryptographic certificate, as defined in EMC CORPORATION Public Key Cryptographic Standards (PKCS), specifically RSA LABORATORIES PKCS#12v.1.1: Personal Information Exchange Syntax, Oct. 27, 2012, available at www.rsa.com, and the container information for the private key and certificate. CryCre may also include the public key instead of the corresponding certificate in cases where such a certificate has not yet been issued, and all certificates in the trust chain to the root certificate authority. CryCre can be created as needed, or pre-created, stored and retrieved when needed. CryCre can reside on a removable smart card. Table 1 summarizes the CryCre:

TABLE 1

| Type of CryCre | Use(s) |
| --- | --- |
| User authentication | Identify user to controller or gateway, and establish a secure communication channel with the controller or gateway. In some embodiments, also used for encrypting data to be stored at the user's device. Each user has one authentication CryCre. |
| User encryption | Present in some embodiments, for encrypting data to be delivered to the user's device or stored at the user's device. Not described in this application, to simplify. |
| User application | Each application may or may not require CryCre, and may have its own technique for issuing and using the CryCre. Each user may have none, one or many application CryCre, depending on how many applications that the user is entitled to access that require their own application CryCre. |
| Gateway authentication | Establish a secure communication channel with a remote device, the controller, applications or third-party systems. Each gateway has one authentication CryCre. |
| Gateway encryption | Encrypt data for storage at the gateway or the controller. When the enterprise administrator wants to store data (such as user CryCre) at the controller, but does not want the controller to be able to use the data, the enterprise administrator specifies that the data be encrypted with the gateway encryption CryCre, and the data is stored along with a flag indicating that it has been encrypted with the gateway encryption CryCre. All gateways associated with a domain generally use the same encryption CryCre. |
| Controller authentication | Establish a secure communication channel with a remote device or |

TABLE 1-continued

| Type of CryCre | Use(s) |
| --- | --- |
| Controller encryption | a gateway. Each controller has one authentication CryCre. In some embodiments, the controller has its own encryption CryCre for encrypting data (such as user or gateway CryCre) stored at the controller. |

Controller 1000 is a general purpose computer programmed in accordance with the present invention. Controller 1000 executes at least four software programs:

certificate authority 1005 for issuing certificates, according to the X.509 standard or other suitable standard, when an enterprise administrator designates controller 1000 as the source thereof;

master administrator interface 1010 for adding enterprise administrators and generating controller cryptographic credentials;

enterprise administrator interface 1020 for enabling an enterprise administrator to generate gateway cryptographic credentials, configure gateways and users in a domain associated with that enterprise, typically using a browser and a secure channel via network 999, and for providing license keys for users to the enterprise administrator; and authorization module 1030 for assisting in user registration, for telling users which applications they are authorized to use, and the addresses of the gateways associated with the applications; and for telling gateways whether users are authorized and which applications they are authorized to use.

Controller 1000 stores at least the following data:

one set of controller cryptographic credentials 1040, including at least its own private key and a security certificate including its public key;

domain data 1050 including, for each enterprise, the address of its gateway(s), which applications are accessible via which gateways, how to obtain the security certificate for the users during registration, the address of its application servers, and for each application, whether the application has its own security certificate, and optionally: the security certificate for each gateway;

user data 1060, shown in FIG. 2B, and including for each user associated with the domain:

user configuration data 1061 including the user's identification code, first name, last name, email address, metadata for user CryCre and certificates, how information should be created during registration, and where to find information used during registration, user certificates 1062 includes any certificates associated with the user (the metadata for the certificates is part of configuration data 1061), user access entitlements 1063 identifies which applications the user is entitled to use, general user access policy 1064 is the general access policy for each application that the user is entitled to use, such as whether a license key or hardware ID is appropriate, and what times of day that the user is entitled to use the application, user application access policy 1065 comprises, for each application, any specific access policies for this user, that take precedence over the general access policy;

optional user cryptographic credentials 1070, which are usually encrypted with the gateway encryption CryCre, when the domain administrator has specified that the user CryCre are stored in controller 1000 for subsequent download to the user;

optional gateway encryption cryptographic credentials 1080, protected with an Epassword as discussed below, and used by the gateway for export and import of user CryCre during registration; controller 1000 stores the gateway encryption CryCre for ease in copying the gateway encryption CryCre to multiple gateways in a domain, as discussed below; and certificate revocation list 1090, indicating which certificates have been revoked by the enterprise administrators, such as when an employee is no longer employed by the enterprise or entitled to use an application.

Remote device 1200 is a tablet computer such as an APPLE iPAD executing the APPLE IOS operating system. In other embodiments, remote device 1200 may be another tablet, such as a MICROSOFT SURFACE tablet executing the MICROSOFT WINDOWS operating system, another tablet executing the GOOGLE ANDROID operating system, a smart phone, a laptop computer or other suitable device. In some embodiments, remote device 1200 is operative to receive removable smart card 1290. In some embodiments, smart card 1290 is embedded in remote device 1200 and is not readily removable. Smart cards are generally based on ISO 7816 (card with contacts) or ISO 14443 (contact-less cards). Smart card 1290 usually generates a mathematically related private key and public key pair to be used in cryptographic credentials, and the private key never leaves smart card 1290.

Remote device 1200 executes at least two software programs:

network browser 1210 for sending information to and receiving information from computers coupled to network 999, and access application 1220 in accordance with the present invention, discussed below. In some embodiments, access application 1220 has an embedded network browser in lieu of network browser 1210.

Remote device 1200 stores at least the following data:

configuration data 1225, associated with access application 1220, indicating methods and values, as discussed below;

user authentication cryptographic credentials 1230, stored in encrypted form, usually encrypted with a Upassword chosen by the user, shown in FIG. 2C. If smart card 1290 is present, user authentication CryCre 1230 reside on smart card 1290;

user encryption cryptographic credentials 1240, optional, discussed above;

user application cryptographic credentials 1250, optional, discussed above.

As used herein and in the claims, a firewall refers to a program that controls network traffic by analyzing data packets to a host and determining whether or not to transmit them to the host, based on a predetermined rule set. The firewall program can run in a separate dedicated device or in another device. The rule set can specify attributes of the packet such as source IP address, source port, destination IP address, destination port or destination service (world wide web or file transfer protocol), protocol used, time-to-live, and so on. An example of a firewall is the Cisco ASA Firewall, described at www.cisco.com.

Firewall 1350 is coupled to network 999 and gateway 1100 via suitable wireline or wireless communication links. Firewall 1350 is a general purpose computer dedicated to executing a firewall program in accordance with a predetermined rule set for determining which data packets from network 999 to pass-through, so that all other data packets from network 999 are blocked.

Gateway 1100 is coupled to firewall 1350, firewall 1360, and optionally third-party 1400 via suitable wireline or wireless communication links. Gateway 1100 is a general purpose computer programmed to cooperate with controller 1000 in accordance with the present invention. At least one instance of gateway 1100 is located at each domain. An enterprise is associated with at least one domain. In some embodiments, gateway 1100 is operative to receive removable smart card 1190.

Gateway 1100 executes at least two software programs:
enterprise administrator interface 1110 for enabling an enterprise administrator to configure gateway 1100; and
authorization module 1120 for determining whether a user is authorized to access an application executing on application server 1300 by communicating with authorization module 1030 executing on controller 1000, and when the determination is positive, for controlling the proxy function.

As used herein and in the claims, a "proxy" means a computer program for receiving information from a first channel and sending it to a second channel, and for receiving information from the second channel and sending it to the first channel.

Gateway 1100 stores at least the following data:
gateway cryptographic credentials 1130, including gateway authentication CryCre and gateway encryption CryCre, discussed above. If smart card 1190 is present, gateway CryCre usually reside on smart card 1190;
gateway data 1140 including how to obtain the security certificate for users during registration, which applications are accessible at application server 1300; and
optional user cryptographic credentials 1150, when the domain administrator has specified that the user CryCre are stored in gateway 1100 for subsequent transfer to the user.

Third-party 1400 is shown with dashed lines in FIG. 2, to indicate that it is absent in some embodiments. Third-party 1400 is shown in FIG. 2 as directly connected to gateway 1100; in some embodiments, third-party 1400 is actually coupled to network 999 and accessed via network 999 by gateway 1100. In some embodiments, a firewall is present between gateway 1100 and third-party 1400. In some embodiments, third-party 1400 is the source of the security certificate for users.

Third-party 1400 executes certificate authority software program 1405 for issuing certificates, according to the X.509 standard or other suitable standard, when an enterprise administrator designates controller 1000 as the source thereof, and stores certificate revocation data 1410, indicating which certificates have been revoked, with list of revocation data per root certificate authority, and optional user cryptographic credentials 1420, when the domain administrator has specified that the user CryCre are stored in third-party 1400 for subsequent transfer to the user. In some embodiments, controller 1000 stores a local copy certificate revocation list 1410.

Firewall 1360 is coupled to gateway 1100 and application server 1300 via suitable wireline or wireless communication links. Firewall 1360 is a general purpose computer dedicated to executing a firewall program in accordance with a predetermined rule set for determining which data packets from gateway 1100 to pass-through, so that all other data packets from gateway 1100 and, optionally, to gateway 1100, are blocked.

Gateway 1100 is said to reside in a demilitarized zone (DMZ) between firewalls 1350 and 1360. As used herein and in the claims, a DMZ means a computing area that is accessible via network 999.

Application server 1300 is a general purpose computer executing applications 1310, 1320, 1330. Generally, a user of remote device 1200 wants to remotely use one of applications 1310-1330, and the present invention enables such remote usage from authorized remote devices while protecting against remote usage from unauthorized remote devices. Each of applications 1310, 1320, 1330 may optionally be associated with respective cryptographic credentials 1315, 1325, 1335.

Web server 1500 is a general purpose computer operative to send and receive information via network 999. Web server 1500 executes application program 1510, which at some points, requires that a user provide the results of a cryptographic operation to be entitled to particular functions of application program 1510.

Various uses of the configuration of FIG. 2A will now be described at a high level with references to FIGS. 3A-5B, followed by a detailed description. Table 2 summarizes some of the configurations that need to be accommodated, to provide flexibility so that domain administrators can optimize for their needs. The rightmost column of Table 2 indicates which of the figures correspond to the configuration of that row.

TABLE 2

|   | Provider | Type | Certificate authority | Source | Encryption | Provided to Remote |
|---|---|---|---|---|---|---|
| 1 | Controller | On-demand | Controller | n/a | n/a | Certificate (3A) |
| 2 | Controller | On-demand | Third-party | n/a | n/a | Certificate (3B) |
| 3 | Controller | Pre-stored | n/a | Controller | unencrypted | CryCre (3C) |
| 4 | Controller | Pre-stored | n/a | Controller | GW-E | CryCre (3D) |
| 5 | Controller | Pre-stored | n/a | Gateway | unencrypted | CryCre (3E) |
| 6 | Controller | Pre-stored | n/a | Gateway | GW-E | CryCre (3F) |
| 7 | Controller | Pre-stored | n/a | Gateway | other-encr | Encr. CryCre (3G) |
| 8 | Controller | Pre-stored | n/a | Third-party | unencrypted | CryCre (3H) |
| 9 | Controller | Pre-stored | n/a | Third- | other-encry | Encr. CryCre |

TABLE 2-continued

| Provider | Type | Certificate authority | Source | Encryption | Provided to Remote |
|---|---|---|---|---|---|
| 10 Gateway | Pre-stored | n/a | party Controller | unencrypted | CryCre |
| 11 Gateway | Pre-stored | n/a | Controller | GW-E | CryCre (3J) |
| 12 Gateway | Pre-stored | n/a | Gateway | unencrypted | CryCre (3I) |
| 13 Gateway | Pre-stored | n/a | Gateway | GW-E | CryCre |
| 14 Gateway | Pre-stored | n/a | Gateway | other-encr | Encr. CryCre |
| 15 Gateway | Pre-stored | n/a | Third-party | unencrypted | CryCre (3K) |
| 16 Gateway | Pre-stored | n/a | Third-party | other-encry | Encr. CryCre |

Figure 3A:
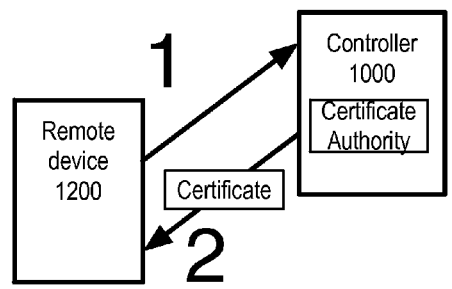
Figure 3B:
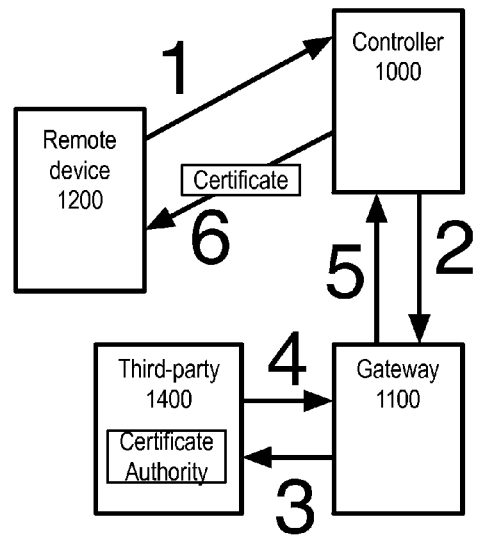

FIGS. 3A-3K are diagrams showing different techniques for distributing security data to a user associated with remote device 1200. FIGS. 3A-3B each show dynamic issuance of a certificate, while FIGS. 3C-3K show how pre-stored CryCre are provided to the remote device for which they were created. Other configurations are possible. Certificate requests are based on the PKCS#10 standard. Cryptographic credentials are in containers according to the PKCS#12 standard. When material is encrypted or decrypted using a password, activity occurs according to the PKCS#5 standard. In other embodiments, other standards are followed.

In the embodiments shown and discussed herein, pre-stored cryptographic credentials are in one place. In other embodiments, for added protection, the cryptographic credentials are divided into multiple parts, with each part stored in a different place. During retrieval, the parts are retrieved from their various locations and combined.

The certificate or CryCre can be used for authentication, encryption or an application, that is, the distribution process is the same regardless of the eventual use of the security data. The pre-stored CryCre are generated as specified by a domain administrator, by either controller 1000, third-party 1400 or possibly another source, and then the domain administrator specifies where they should be stored.

FIG. 3A shows dynamic issuance of a certificate, where the domain administrator has designated controller 1000 as the certificate authority for remote device 1200. Remote device 1200 requests a certificate for its public key (path 1), and controller 1000 issues the certificate and sends it to remote device 1200 (path 2).

FIG. 3B shows dynamic issuance of a certificate, where the domain administrator has designated third-party 1400 as the certificate authority for remote device 1200. Remote device 1200 requests a certificate for its public key from controller 1000 (path 1), which forwards the request to gateway 1100 (path 2), which forwards the request to third-party 1400 (path 3), which issues the certificate and sends it to gateway 1100 (path 4), that sends it to controller 1000 (path 5), that sends it to remote device 1200 (path 6).

Figure 3C:
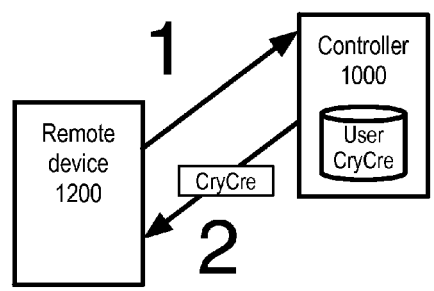

FIG. 3C shows how pre-stored user CryCre are delivered to remote device 1200, where the domain administrator has designated controller 1000 as the storage location for the user CryCre. Remote device 1200 requests CryCre (path 1), and controller 1000 retrieves the CryCre and sends to remote device 1200 (path 2).

Figure 3D:
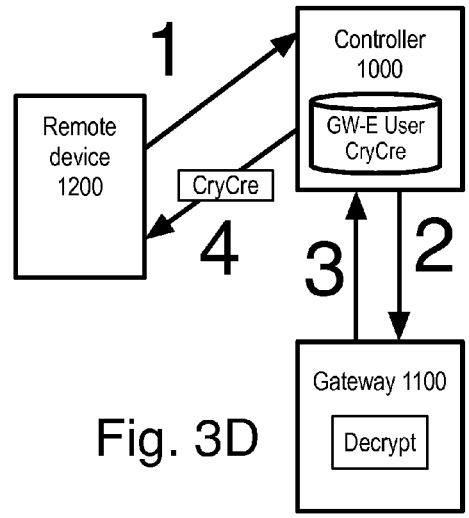

FIG. 3D shows how pre-stored user CryCre are delivered to remote device 1200, where the domain administrator has designated controller 1000 as the storage location for the user CryCre, and the CryCre are encrypted with the gateway encryption CryCre prior to storage at controller 1000. Remote device 1200 requests CryCre (path 1), and controller 1000 retrieves the encrypted CryCre, determines that the gateway can decrypt, sends the encrypted CryCre to gateway 1100 (path 2). Gateway 1100 decrypts the encrypted CryCre and sends the unencrypted CryCre to controller 1000 (path 3) which sends the CryCre to remote device 1200 (path 4).

Figure 3E:
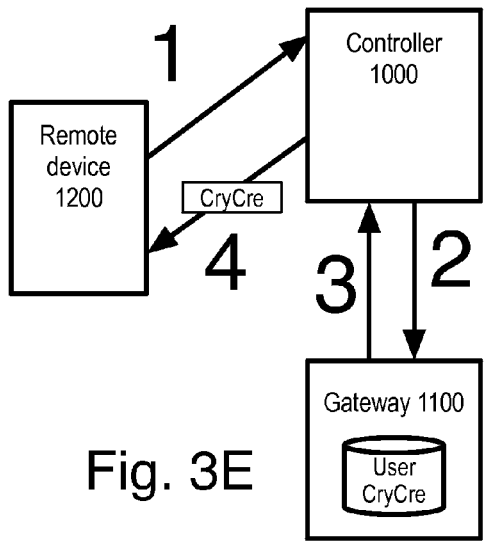

FIG. 3E shows how pre-stored user CryCre are delivered to remote device 1200, where the domain administrator has designated gateway 1100 as the storage location for the user CryCre. Remote device 1200 requests CryCre (path 1), and controller 1000 forwards the request to gateway 1100 (path 2). Gateway 1100 retrieves the CryCre and sends to controller 1000 (path 3), which sends to remote device 1200 (path 4).

Figure 3F:
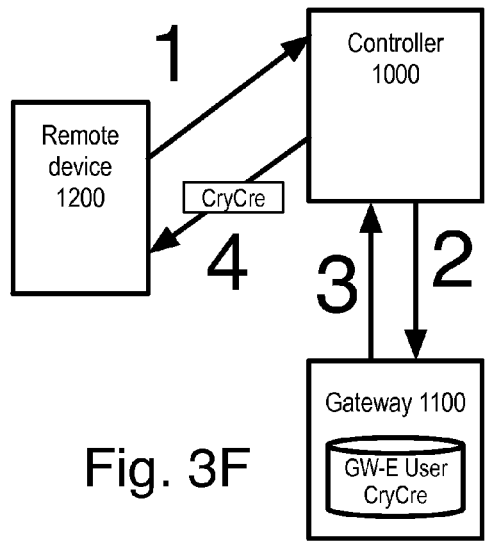

FIG. 3F shows how pre-stored user CryCre are delivered to remote device 1200, where the domain administrator has designated gateway 1100 as the storage location for the user CryCre, and the CryCre are encrypted prior to storage using the gateway encryption CryCre. Remote device 1200 requests CryCre (path 1), and controller 1000 forwards the request to gateway 1100 (path 2). Gateway 1100 retrieves the encrypted CryCre, decrypts, and sends to controller 1000 (path 3), which sends to remote device 1200 (path 4).

Figure 3G:
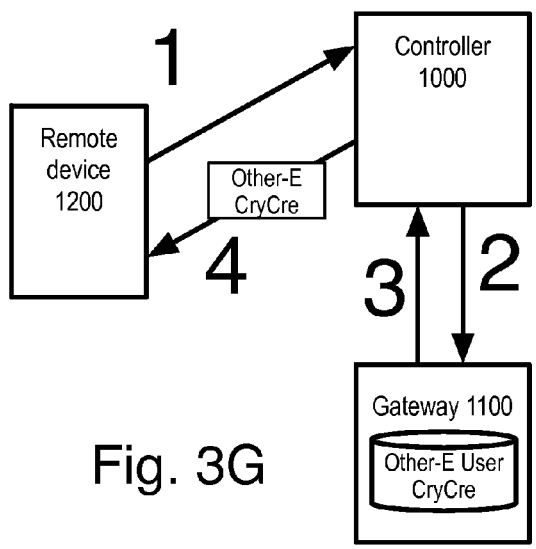

FIG. 3G shows how pre-stored user CryCre are delivered to remote device 1200, where the domain administrator has designated gateway 1100 as the storage location for the user CryCre, and the CryCre are encrypted prior to storage using CryCre unknown to gateway 1100. Remote device 1200 requests CryCre (path 1), and controller 1000 forwards the request to gateway 1100 (path 2). Gateway 1100 retrieves the encrypted CryCre, and sends to controller 1000 (path 3), which sends to remote device 1200 (path 4). Remote device 1200 must have the ability to decrypt the encrypted CryCre, in accordance with the domain administrator's policy.

Figure 3H:
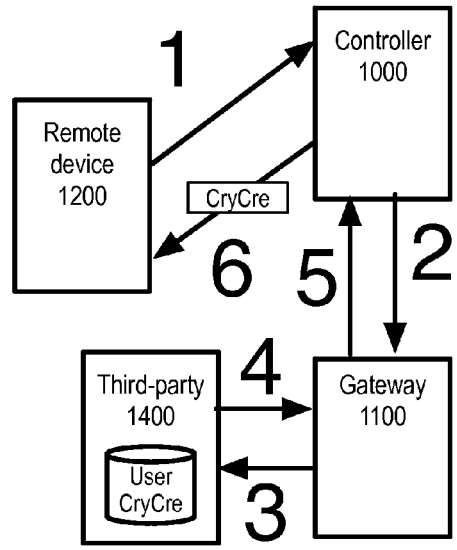

FIG. 3H shows how pre-stored user CryCre are delivered to remote device 1200, where the domain administrator has designated third-party 1400 as the storage location for the user CryCre. Remote device 1200 requests CryCre (path 1), and controller 1000 forwards the request to gateway 1100 (path 2), which forward the request to third-party 1400 (path 3). Third-party 1400 retrieves the CryCre, and sends to gateway 1100 (path 4), which sends to controller 1000 (path 5), which sends to remote device 1200 (path 6).

FIG. 3I shows how pre-stored user CryCre are delivered to remote device 1200, where the domain administrator has designated gateway 1100 as the storage location for the user CryCre. Remote device 1200 requests CryCre (path 1), and controller 1000 instructs remote device 1200 to request CryCre from gateway 1100 (path 2). Remote device 1200 requests CryCre from gateway 1100 (path 3). Gateway 1100 retrieves the CryCre, and sends to remote device 1200 (path 4).

FIG. 3J shows how pre-stored user CryCre are delivered to remote device 1200, where the domain administrator has designated controller 1000 as the storage location for the user CryCre, and the CryCre are encrypted with the gateway encryption CryCre prior to storage at controller 1000. Remote device 1200 requests CryCre (path 1), and controller 1000 instructs remote device 1200 to request CryCre from gateway 1100 (path 2). Remote device 1200 requests CryCre from gateway 1100 (path 3), and gateway 1100 requests CryCre from controller 1000 (path 4). Controller 1000 retrieves the encrypted CryCre and sends the encrypted CryCre to gateway 1100 (path 5). Gateway 1100 decrypts the encrypted CryCre and sends the unencrypted CryCre to remote device 1200 (path 6).

FIG. 3K shows how pre-stored user CryCre are delivered to remote device 1200, where the domain administrator has designated third-party 1400 as the storage location for the user CryCre. Remote device 1200 requests CryCre (path 1), and controller 1000 instructs remote device 1200 to request CryCre from gateway 1100 (path 2). Remote device 1200 requests CryCre from gateway 1100 (path 3), which forward the request to third-party 1400 (path 4). Third-party 1400 retrieves the CryCre, and sends to gateway 1100 (path 5), which sends to remote device 1200 (path 6).

Figure 4A:
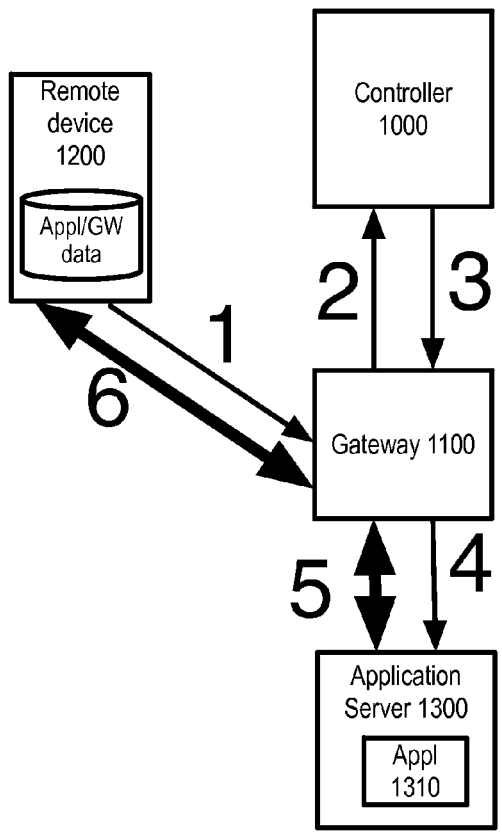
FIGS. 4A-4C are diagrams showing different techniques for establishing a data session.
Figure 4B:
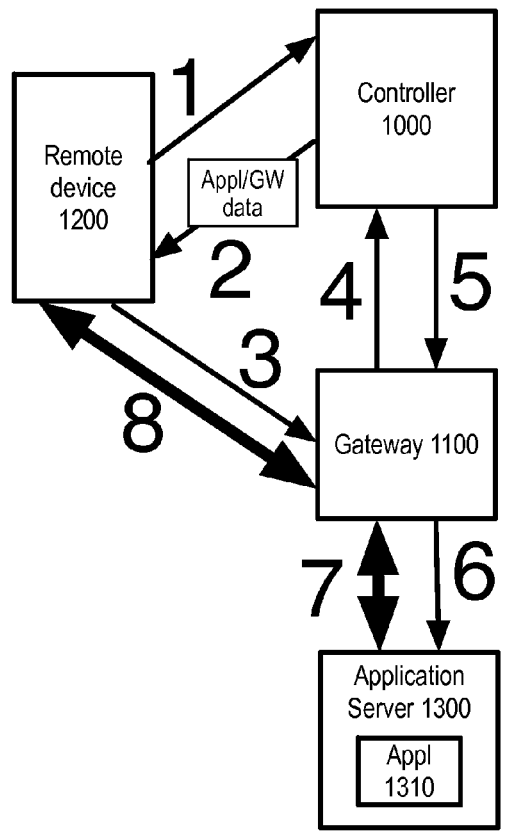
Figure 4C:
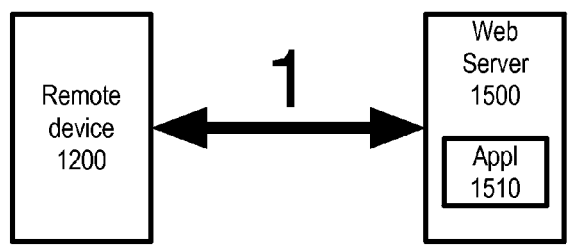

FIGS. 4A-4C are diagrams showing different techniques for establishing a data session. FIGS. 4A-4B show establishing a secure data session, while FIG. 4C shows establishing a non-secure data session.

FIG. 4A shows that remote device 1200 stores data identifying, for each application that the user is entitled to use, the network address of the associated gateway. Remote device 1200 sends a message to gateway 1100 requesting access to the application, such as application 1310 (path 1). Gateway 1100 contacts controller 1000 to determine whether this user is recognized and whether this user is entitled to use application 1310 (path 2). Controller 1100 replies (path 3). If the user is recognized and authorized, then the gateway makes a communication channel for the user to application 1310 executing on application server 1300. The data session occurs with gateway 1100 serving as a proxy for communications between application 1310 (path 5) and remote device 1200 (path 6).

FIG. 4B is similar to FIG. 4A, and for brevity, only the differences are discussed. Here, remote device 1200 must contact controller 1000 prior to each data session to request data for the applications it is entitled to use and their gateway addresses (path 1), and controller 1000 provides this data (path 2).

FIG. 4C shows a non-secure data session, where remote device 1200 simply sends a request for usage of application 1510 to web server 1500 via network 999.

Figure 5A:
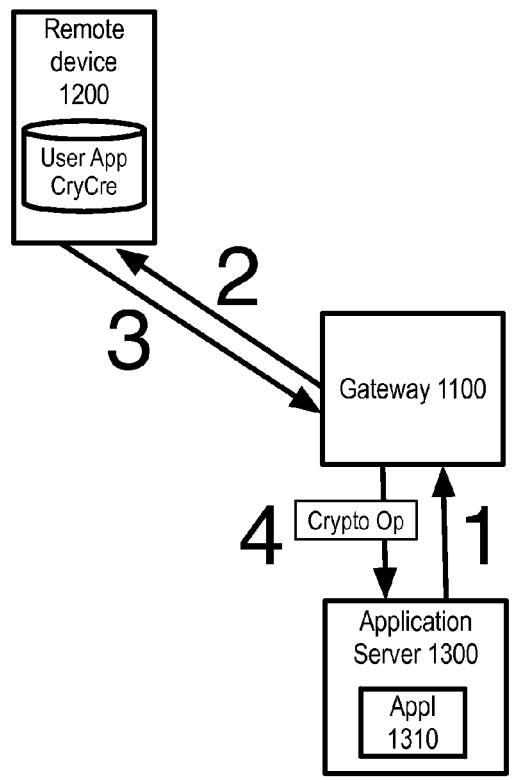
FIGS. 5A-5B are diagrams showing different techniques for performing a cryptographic operation.
Figure 5B:
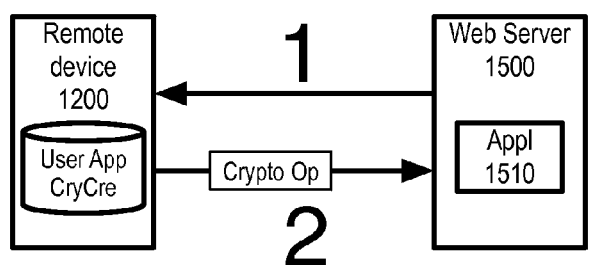

FIGS. 5A-5B are diagrams showing different techniques for performing a cryptographic operation.

FIG. 5A shows a secure data session, established via one of the techniques depicted in FIGS. 4A-4B. Application 1310 sends a message to proxy gateway 1100 requesting the results of a cryptographic operation from the user (path 1), and gateway 1100 forwards the request to the user (path 2). Remote device 1200 performs the requested operation using its application cryptographic credentials, then sends a message to proxy gateway 1100 with the results of the cryptographic operation (path 3), and gateway 1100 forwards the response to application 1310 (path 4).

FIG. 5B is similar to FIG. 5A, except that there is no gateway 1100 functioning as a proxy. Instead, application 1510 sends a message directly to remote device 1200 requesting the results of a cryptographic operation from the user (path 1). Remote device 1200 performs the requested operation using its application cryptographic credentials, then sends a message to application 1510 with the results of the cryptographic operation (path 2).

At various points in the set-up, registration and operation flowcharts below, the procedure of "establish secure channel" is used. Any appropriate technique may be used. In this embodiment, a secure channel is established using the Transport Layer Security protocol, defined in Internet Engineering Task Force Request For Comments 5246, available at tools.i-etf.org/html/rfc5246, specifying a procedure involving about twenty steps. It will be understood that when each endpoint of the channel has a security certificate, then the channel is "mutually authenticated" in that both endpoints cryptographically validate each other's cryptographic credentials. However, if only one endpoint of the channel has a security certificate and corresponding cryptographic credentials, as occurs during remote device registration when the remote device is one of the channel endpoints and lacks its own security certificate, then the remote device uses cryptographic methods to authenticate the controller and establish the secure communication channel, but the controller cannot use cryptographic methods to authenticate the remote device.

The set-up procedure for the configuration of FIG. 2 will now be discussed.

FIGS. 6A-6H are flowcharts showing the set-up procedure.

In FIG. 6A, at step 2010, firewall 1350 is configured to allow properly formatted requests to gateway 2010. A properly formatted request comprises a TCP/IP packet from any sender that has a destination of a specified gateway port.

In FIG. 6B, at step 2020, firewall 1360 is configured to allow properly formatted requests to application server 1300. A properly formatted request comprises a TCP/IP packet from gateway 1100 and addressed to one of the applications executing on application server 1300, i.e., application 1310, 1320 or 1330, and forwarded by the operating system of application server 1300 to the application.

In FIG. 6C, step 2050, a master administrator uses master administrator interface 1010 to generate cryptographic credentials for controller 1000, and stores the controller CryCre in controller crypto credentials 1040 shown in FIG. 2A. For instance, the OpenSSL Toolkit, available at www.openssl.org, may be used to generate cryptographic credentials. OpenSSL 1.0.1e was released on Feb. 11, 2013. The openssl program is a command line tool for using the cryptography functions of the OpenSSL crypto library, including:

Creation and management of private keys, public keys and parameters,
Public key cryptographic operations,
Creation of X.509 certificates, CSRs and CRLs, and
Encryption and Decryption with Ciphers.

At step 2055, the master administrator uses master administrator interface 1010 to create enterprise domains and authorize respective enterprise administrators. Practically, when an enterprise becomes a customer for the controller/gateway services described herein, the enterprise designates someone as its enterprise administrator, also referred to as a domain administrator.

At step 2060, a domain administrator for the enterprise associated with application server 1300 provides common data for the domain, to populate domain data 1050. Generally, the domain administrator uses a browser and a secure channel via network 999 to access enterprise administrator interface 1020, and either provides data via a screen-based graphical user interface, or uploads a data file in a predetermined format (see FIG. 6D step 2112).

At step 2065, the domain administrator populates user data 1060 for the domain using enterprise administrator interface

Figure 6D:
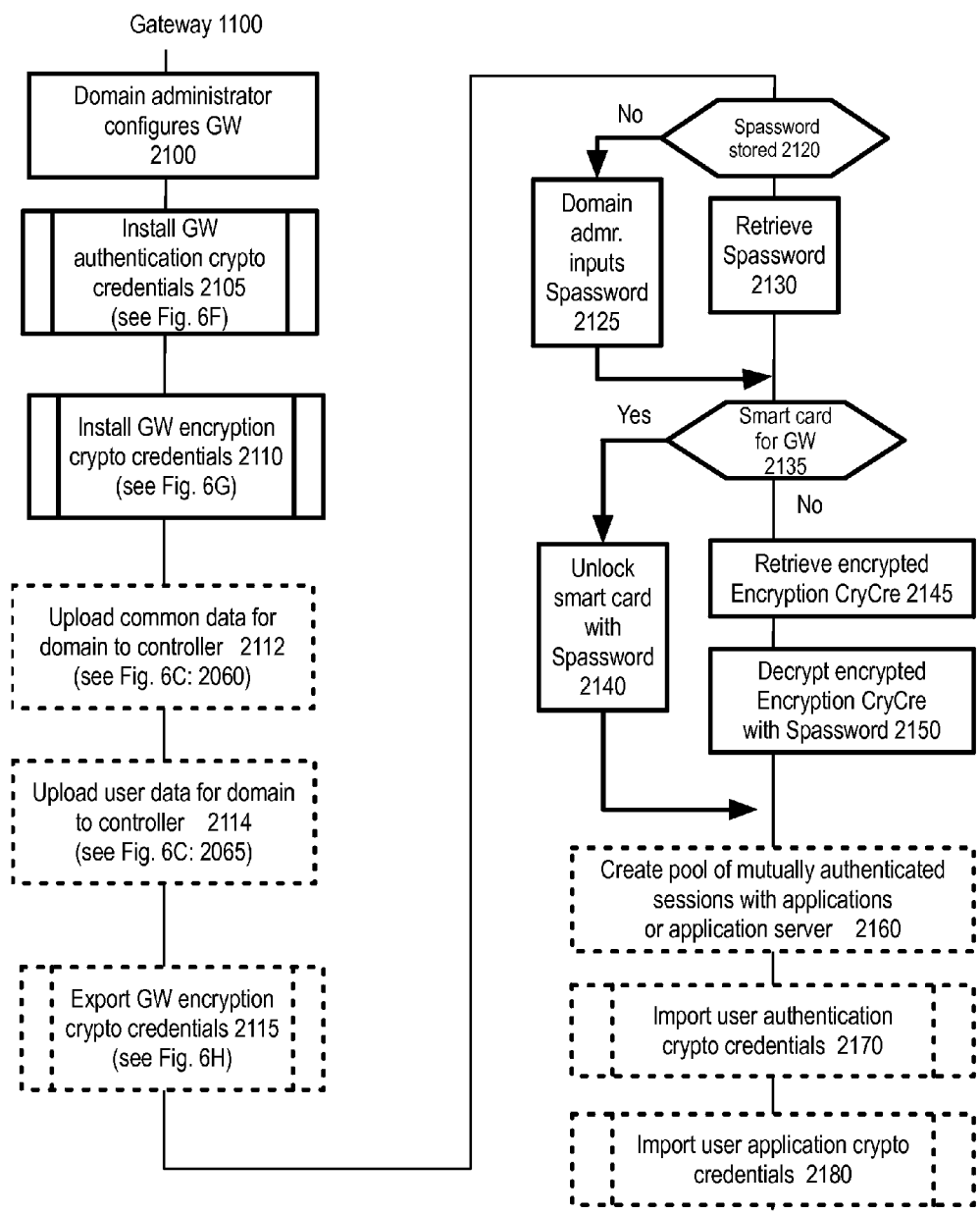

1020, via a screen-based graphical user interface, or uploads a data file in a predetermined format (see FIG. 6D step 2114).

At optional step 2070, enterprise administrator interface 1020 provides a license key for each user. More specifically, if domain data 1050 indicates that the domain will use license keys for its users, then license keys are generated for the users at step 2070.

At optional step 2075, the domain administrator provides user authentication cryptographic credentials to controller 1000, for storage therein. The domain administrator may interact directly with enterprise administrator interface 1020 executing on controller 1000, or the domain administrator may interact with enterprise administrator interface 1110 executing on gateway 1100, and gateway 1100 forwards the information to enterprise administrator interface 1020 on controller 1000. The double vertical lines around the box in FIG. 6C indicate that it is a process further described in another flowchart, specifically, the left-hand side of the flowchart of FIG. 6E discussed below.

At optional step 2080, the domain administrator provides user application cryptographic credentials to controller 1000, for storage therein. The double vertical lines around the box in FIG. 6C indicate that it is a process further described in another flowchart, specifically, the left-hand side of the flowchart of FIG. 6E discussed below.

The domain administrator deploys gateway 1100 for use with application server 1300.

Figure 6E:
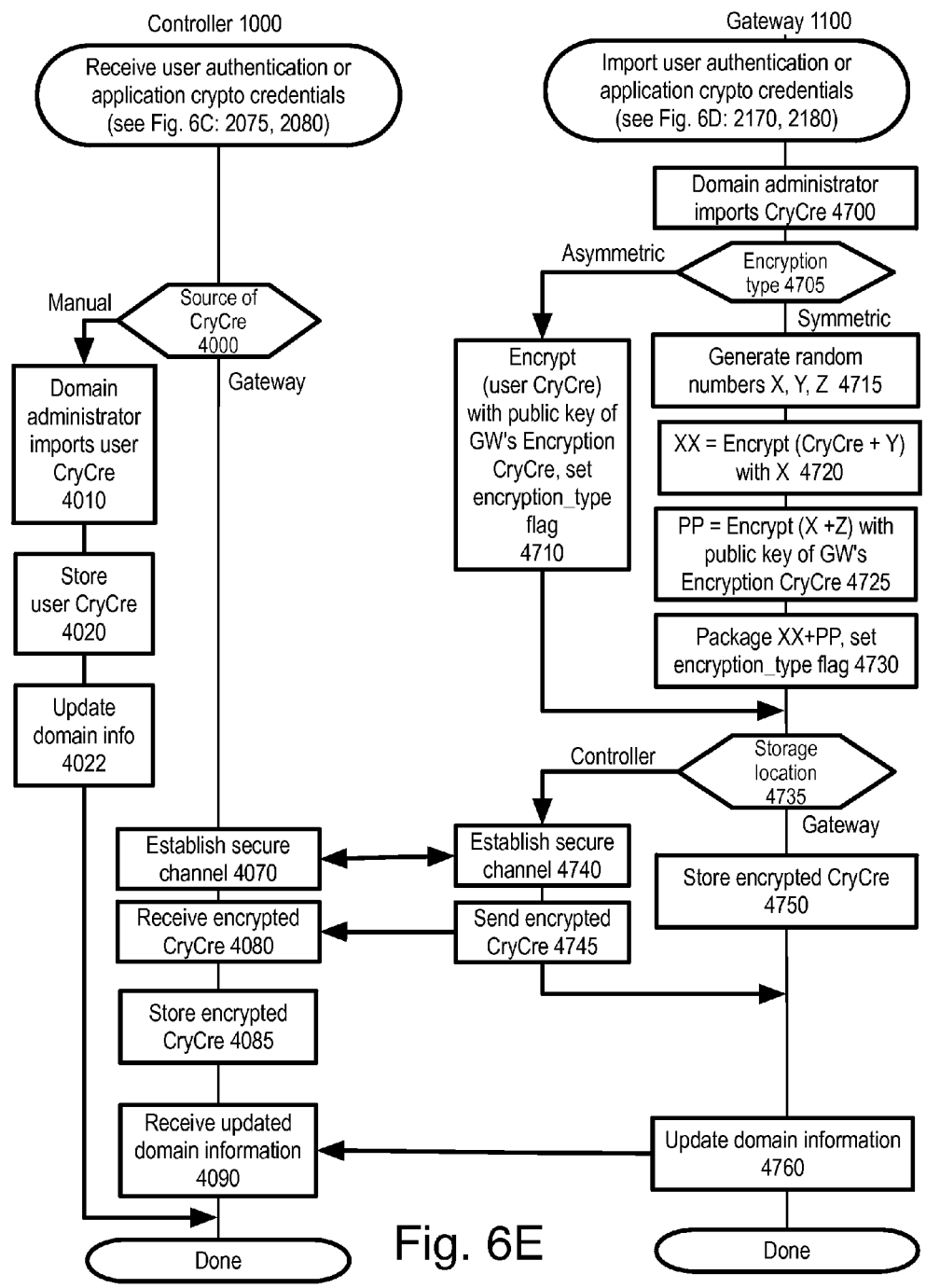
Figure 6F:
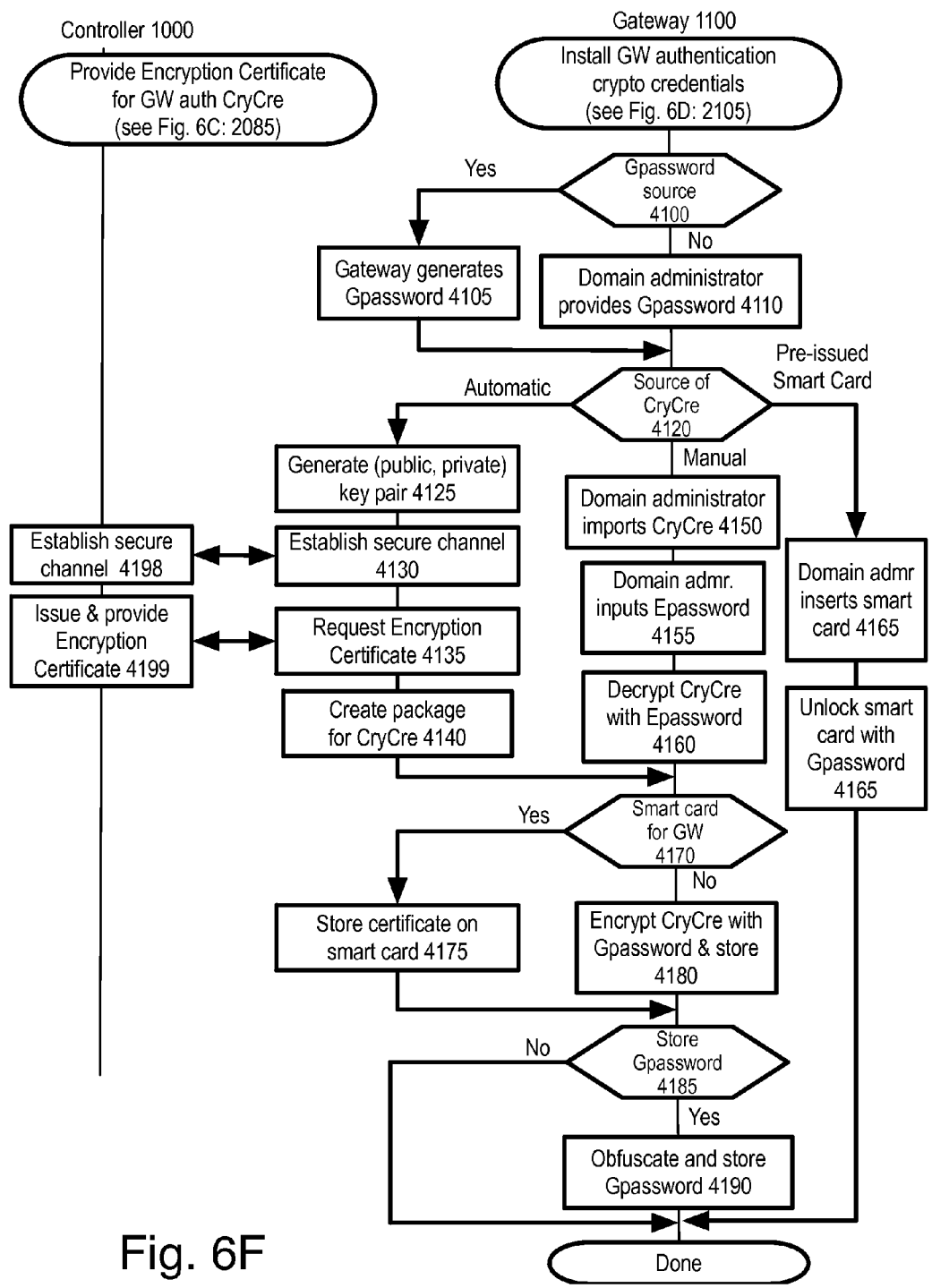

At step 2085, controller 1000 provides an encryption certificate for gateway authentication cryptographic credentials, see the left-hand side of FIG. 6F.

Figure 6G:
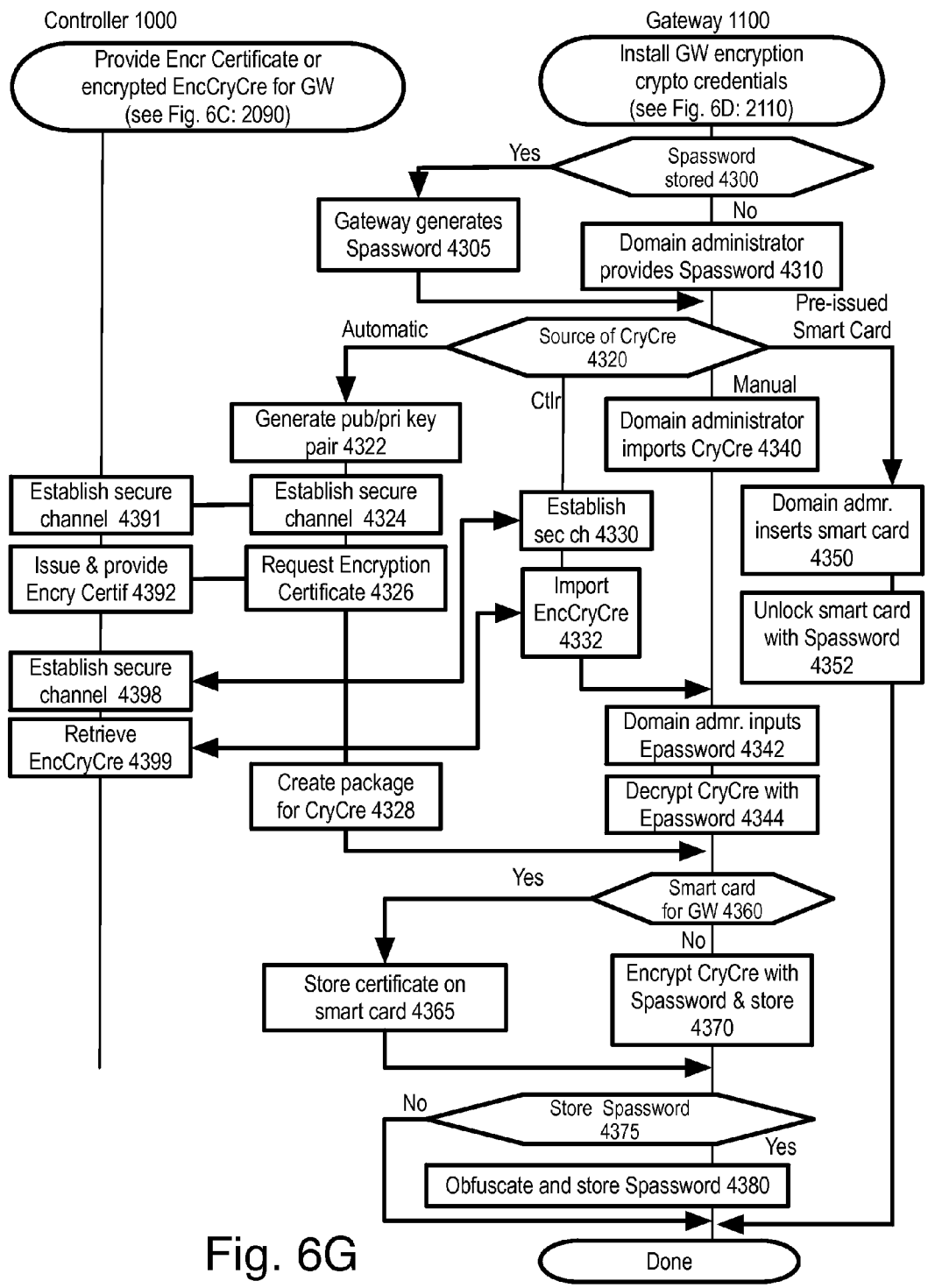

At step 2090, controller 1000 provides an encryption certificate for gateway encryption cryptographic credentials, or provides the encrypted gateway encryption cryptographic credentials, see the left-hand side of FIG. 6G.

Figure 6H:
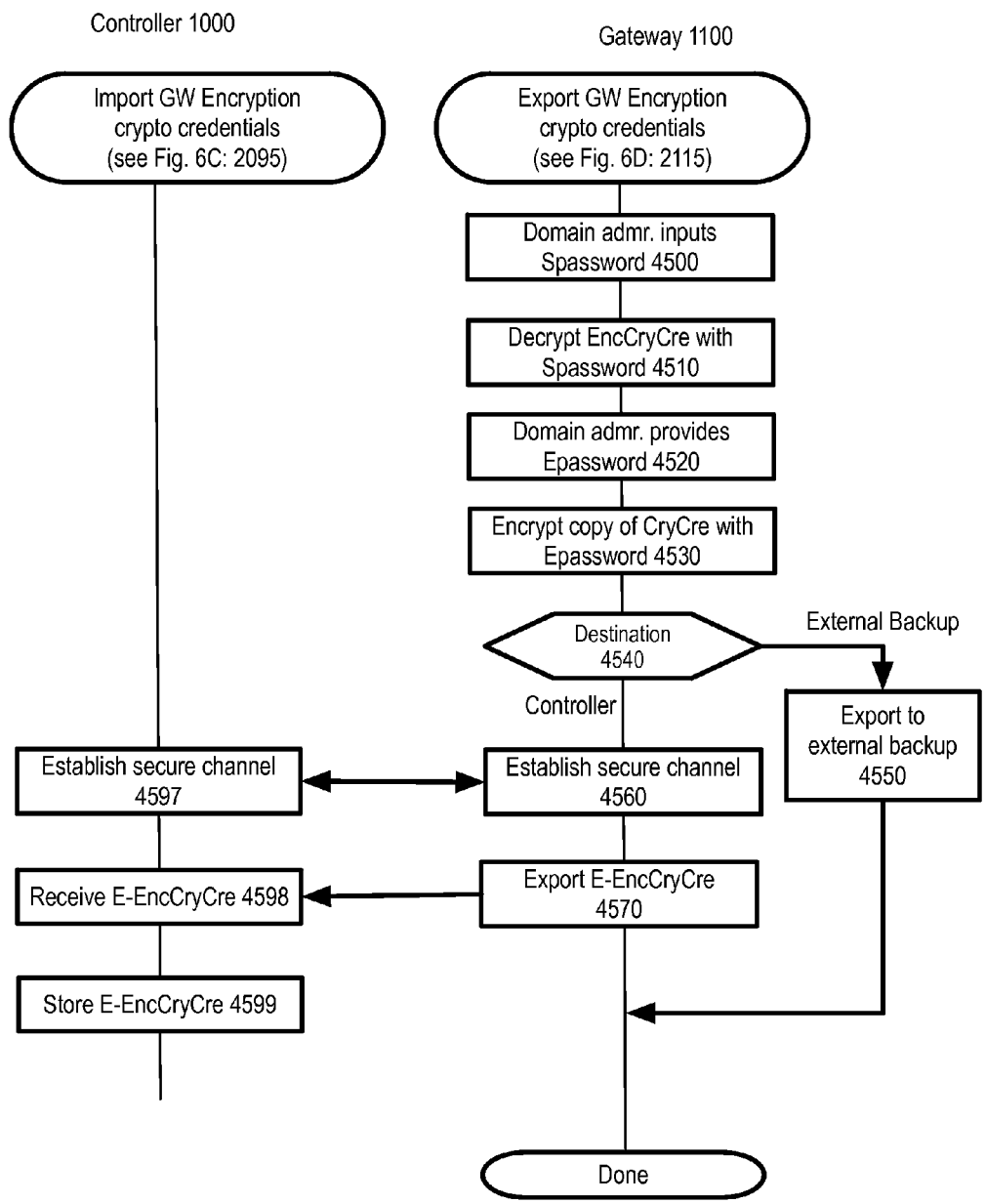

At optional step 2095, controller 1000 imports gateway encryption cryptographic credentials, see the left-hand side of FIG. 6H.

In FIG. 6D, at step 2100, the domain administrator configures gateway 1100, populating gateway data 1040, using domain administrator interface 1110. The process of configuring includes:
 the domain administrator creates and stores a security password ("Gpassword"), so that only holders of the Gpassword—typically only the domain administrator—can modify the authentication CryCre of the gateway;
 the domain administrator creates and stores a security password ("Spassword"), so that only holders of the Spassword—typically only the domain administrator—can modify the encryption CryCre of the gateway; and
 optionally, the domain administrator creates and stores an export password ("Epassword"), so that only the holders of the Epassword—typically only the domain administrator—can export cryptographic credentials from the gateway. A different Epassword can be defined for each instance of exporting.

At step 2105, the domain administrator installs the gateway authentication cryptographic credentials. The double vertical lines around the box in FIG. 6D indicate that it is a process further described in another flowchart, specifically, the right-hand side of the flowchart of FIG. 6F discussed below.

At step 2110, the domain administrator installs the gateway encryption cryptographic credentials. The double vertical lines around the box in FIG. 6D indicate that it is a process further described in another flowchart, specifically, the right-hand side of the flowchart of FIG. 6G discussed below.

At optional step 2112, the domain administrator uploads common data for the domain to controller 1000, see FIG. 6C step 2060.

At optional step 2114, the domain administrator uploads user data for the domain to controller 1000, see FIG. 6C step 2065.

At optional step 2115, typically used when a domain is associated with multiple gateways, the domain administrator exports the gateway encryption cryptographic credentials, created at step 2110, to controller 1000, for convenient distribution to the other gateways associated with the domain. The domain administrator usually also exports the gateway encryption cryptographic credentials for back-up, such as to removable storage media that is kept in a physically secured location. The double vertical lines around the box in FIG. 6D indicate that it is a process further described in another flowchart, specifically, the right-hand side of the flowchart of FIG. 6H discussed below.

The remaining steps in FIG. 6D are assumed to be executed during set-up and also after each power-up or rebooting activity.

At step 2120, enterprise administrator interface 1110 checks whether the Spassword (see step 2100) is stored. If not, which is the preferred and more secure method of operating gateway 1100, then at step 2125, the domain administrator inputs the Spassword. Otherwise, at step 2130, enterprise administrator interface 1110 retrieves the stored Spassword from gateway data 1140. Steps 2120, 2130, 2135 are repeated for the Gpassword (not shown).

At step 2135, enterprise administrator interface 1110 checks whether gateway smart card 1190 is present in gateway 1100. If so, interface 1110 uses the Spassword to unlock smart card 1190. ISO standard 7816-15 describes use of smart cards: locking, unlocking and cryptographic operations. If there is no smart card, at step 2145, interface 1110 retrieves the encryption cryptographic credentials for the gateway (installed at step 2110), and at step 2150, interface 1110 decrypts the encrypted gateway encryption cryptographic credentials using the Spassword. Steps 2135, 2140, 2145, 2150 are repeated for the Gpassword (not shown).

At optional step 2160, enterprise administrator interface 1110 creates a set of pools of mutually authenticated sessions with applications 1310, 1320, 1330, respectively, to save time later by avoiding the time delay of creating a channel. A channel from this pool is used in FIG. 8D step 3481. In some embodiments, there are respective channel pools for the applications. In other embodiments, there is one trusted (secure and mutually authenticated) channel between gateway 1100 and application server 1300, for instance, according to the IPsec protocol, and the application sessions may rely on the trusted channel.

At optional step 2170, the domain administrator imports authentication cryptographic credentials for its users, populating user cryptographic credentials 1150, using domain administrator interface 1110, see the right-hand side of FIG. 6E.

At optional step 2180, the domain administrator imports application cryptographic credentials for its users, populating user cryptographic credentials 1150, using domain administrator interface 1110, see the right-hand side of FIG. 6E.

FIG. 6E shows the process by which controller 1000 and gateway 1100 receive user cryptographic credentials. This discussion concerns user authentication CryCre and user application CryCre, but also applies to user encryption CryCre in embodiments where user encryption CryCre are used.

Turning to the controller, see FIG. 6C steps 2075 and 2080, at step 4000, enterprise administrator interface 1020 determines whether the source of the user cryptographic credentials is manual entry or gateway 1100, using either domain data 1050 or asking the domain administrator.

If the source of the user cryptographic credentials is manual entry, at step 4010, the domain administrator provides a file with the user cryptographic credentials or imports the cryptographic credentials one at a time, at step 4020, controller 1000 stores the CryCre in user crypto credentials 1070, at step 4022, enterprise administrator interface 1020 updates domain data 1050, and processing is complete.

If the source of the user cryptographic credentials is gateway 1100, then at step 4070, controller 1000 establishes a secure channel with gateway 1100 in response to a request from gateway 1100 at step 4740, discussed below. At step 4080, controller 1000 receives encrypted user cryptographic credentials from gateway 1100. At step 4085, controller 1000 stores the encrypted user CryCre in user crypto credentials 1070.

At step 4090, controller 1000 receives updated domain information, namely, the metadata that the user cryptographic credentials are stored in user crypto credentials 1070, and updates domain data 1050 and user data 1060, as appropriate.

Turning to the gateway, see FIG. 6D steps 2170 and 2180, at step 4700, similar to step 4010, the domain administrator provides a file with the user cryptographic credentials. At step 4075, the domain administrator specifies whether the encryption type is asymmetric or symmetric. Symmetric encryption is performed according to the AES standard; in other embodiments, other standards are followed.

If asymmetric encryption is used, at step 4710, enterprise administrator interface 1110 encrypts the user cryptographic credentials with the public key of the gateway encryption cryptographic credentials, tags the encrypted user CryCre with the gateway certificate used for encryption, sets a flag indicating that the encryption type is asymmetric, and either attaches a tag that identifies the certificate or provides (appends) the certificate. Processing continues at step 4735.

If symmetric encryption is used, at step 4715, enterprise administrator interface 1110 generates random numbers X, Y and Z. At step 4720, interface 1110 encrypts the user cryptographic credentials plus the random number Y, using the random number X, to generate a number XX. At step 4725, interface 1110 encrypts the sum of random numbers X and Z with the public key of the gateway encryption cryptographic credentials to generate a number PP. At step 4730, interface 1110 packages the sum XX+PP, sets a flag indicating that the encryption type is symmetric, and either attaches a tag that identifies the certificate or provides (appends) the certificate.

At step 4735, interface 1110 determines whether the storage destination of the user cryptographic credentials is controller 1000 or gateway 1100, using gateway data 1140 or asking the domain administrator. If the storage destination is gateway 1100, then interface 1110 stores the encrypted user cryptographic credentials in user crypto credentials 1150, and processing continues at step 4760.

If the storage destination is controller 1000, at step 4740, gateway 1100 establishes a secure channel with controller 1000. At step 4745, gateway 1100 sends the encrypted user cryptographic credentials to controller 1000.

At step 4760, enterprise administrator interface 1110 on gateway 1100 sends a message to enterprise administrator interface 1020 on controller 1000, providing metadata about the user cryptographic credentials, including where they are stored, whether they are encrypted, their encryption method and so on.

FIG. 6F shows the process for installing gateway authentication cryptographic credentials. The left-hand side of FIG. 6F corresponds to FIG. 6C step 2085. The right-hand side of FIG. 6F corresponds to FIG. 6D step 2105.

At step 4100, enterprise administrator interface 1110 on gateway 1100 checks the source of the Gpassword. If not, which is the preferred and more secure method of operating gateway 1100, then at step 4110, the domain administrator inputs the Gpassword. Otherwise, at step 4015, enterprise administrator interface 1110 retrieves the stored Gpassword from gateway data 1140.

At step 4120, enterprise administrator interface 1110 determines the source of the cryptographic credentials:
1. obtained from a smart card that contains pre-issued cryptographic credentials;
2. based on a public/private key pair generated by gateway 1100 and a corresponding certificate issued by controller 1000 for the public key portion, or
3. manually imported by the domain administrator.

For the first case, cryptographic credentials obtained from a pre-issued smart card, at step 4165, the domain administrator inserts the smart card, and at step 4167, interface 1110 unlocks the smart card using the Gpassword and retrieves the cryptographic credentials from the smart card, and the procedure of FIG. 6F is complete.

For the second case, cryptographic credentials based on a public/private key pair generated by gateway 1100 and a corresponding certificate issued by controller 1000, at step 4125, interface 1110 generates a public and private key pair. At step 4130, interface 1110 establishes a secure channel with controller 1000. At step 4135, interface 1110 sends the public key to controller 1000, requests a corresponding authentication certificate, and receives the certificate. At step 4140, interface 1110 creates a cryptographic credentials package including the private key and the certificate, according to the PKCS#12 standard.

At controller 1000, at step 4198, controller 1000 does its part to establish a secure channel. At step 4199, certificate authority 1005 issues a certificate corresponding to the public key, and provides the certificate to gateway 1100.

Processing continues at step 4170.

For the third case, cryptographic credentials manually provided by the domain administrator, at step 4150, the domain administrator imports the cryptographic credentials. At step 4155, the domain administrator provides the Epassword to interface 1110. At step 4160, interface 1110 uses the Epassword to decrypt the imported cryptographic credentials.

At step 4170, enterprise administrator interface 1110 checks whether gateway smart card 1190 is present. If so, at step 4175, interface 1110 stores the cryptographic credentials on smart card 1190. It will be appreciated that the private key is already on smart card 1190. If not, at step 4180, interface 1110 encrypts the cryptographic credentials according to the PKCS#5 standard with the Gpassword and stores them in user crypto credentials 1150.

At step 4185, interface 1110 determines whether it should store the Gpassword. If so, interface 1110 obfuscates the Gpassword, such as by XOR-ing it with another number, and stores it in gateway data 1140, preferably in a visible-to-system only area. Storing the Gpassword means that gateway 1100 can be started or rebooted without intervention from the enterprise administrator. Not storing the Gpassword is more secure, but requires the domain administrator to enter the Gpassword.

FIG. 6G shows the process for installing gateway encryption cryptographic credentials. This process is similar to the process shown in FIG. 6F. For brevity, only differences are discussed. The left-hand side of FIG. 6G corresponds to FIG. 6C step 2090. The right-hand side of FIG. 6G corresponds to FIG. 6D step 2110.

FIG. 6G uses the Spassword in places where FIG. 6F used the Gpassword.

In FIG. 6G, at step 4320, there is a fourth source of the cryptographic credentials: controller 1000, such as when a domain has multiple gateways using the same encryption cryptographic credentials. At step 4330, interface 1110 establishes a secure channel with controller 1000. At step 4332, interface 1110 sends a request for the gateway encryption cryptographic credentials to controller 1000, and receives them. At step 4398, controller 1000 does its part in establishing a secure channel. At step 4399, controller 1000 sends the gateway encryption cryptographic credentials to gateway 1100. Processing continues at step 4342, corresponding to FIG. 6F step 4155.

FIG. 6H shows the process for exporting gateway encryption cryptographic credentials. The left-hand side of FIG. 6H corresponds to FIG. 6C step 2095. The right-hand side of FIG. 6H corresponds to FIG. 6D step 2115.

At step 4500, the domain administrator enters the Spassword to enterprise administrator interface 1110.

At step 4510, interface 1110 decrypts the encrypted cryptographic credentials using the Spassword.

At step 4520, the domain administrator provides the Epassword (see step 2100 of FIG. 6D).

At step 4530, interface 1110 encrypts the previously decrypted cryptographic credentials using the Epassword.

At step 4540, interface 1110 checks the destination for exporting. If the destination is an external backup, such as removable media or enterprise network storage, at step 4550, interface 1110 sends the encrypted cryptographic credentials to the external destination.

If the destination is controller 1000, at step 4560, gateway 1100 establishes a secure channel with the controller, and at step 4570, interface 1110 sends the encrypted cryptographic credentials to controller 1000.

Turning to the controller, at step 4596, enterprise administrator interface 1020 establishes a secure channel with gateway 1100. At step 4598, interface 1020 receives the encrypted cryptographic credentials. At step 4599, interface 1020 stores the encrypted cryptographic credentials in user crypto credentials 1070.

The user registration procedure for the configuration of FIG. 2 will now be discussed.

Figure 7A:
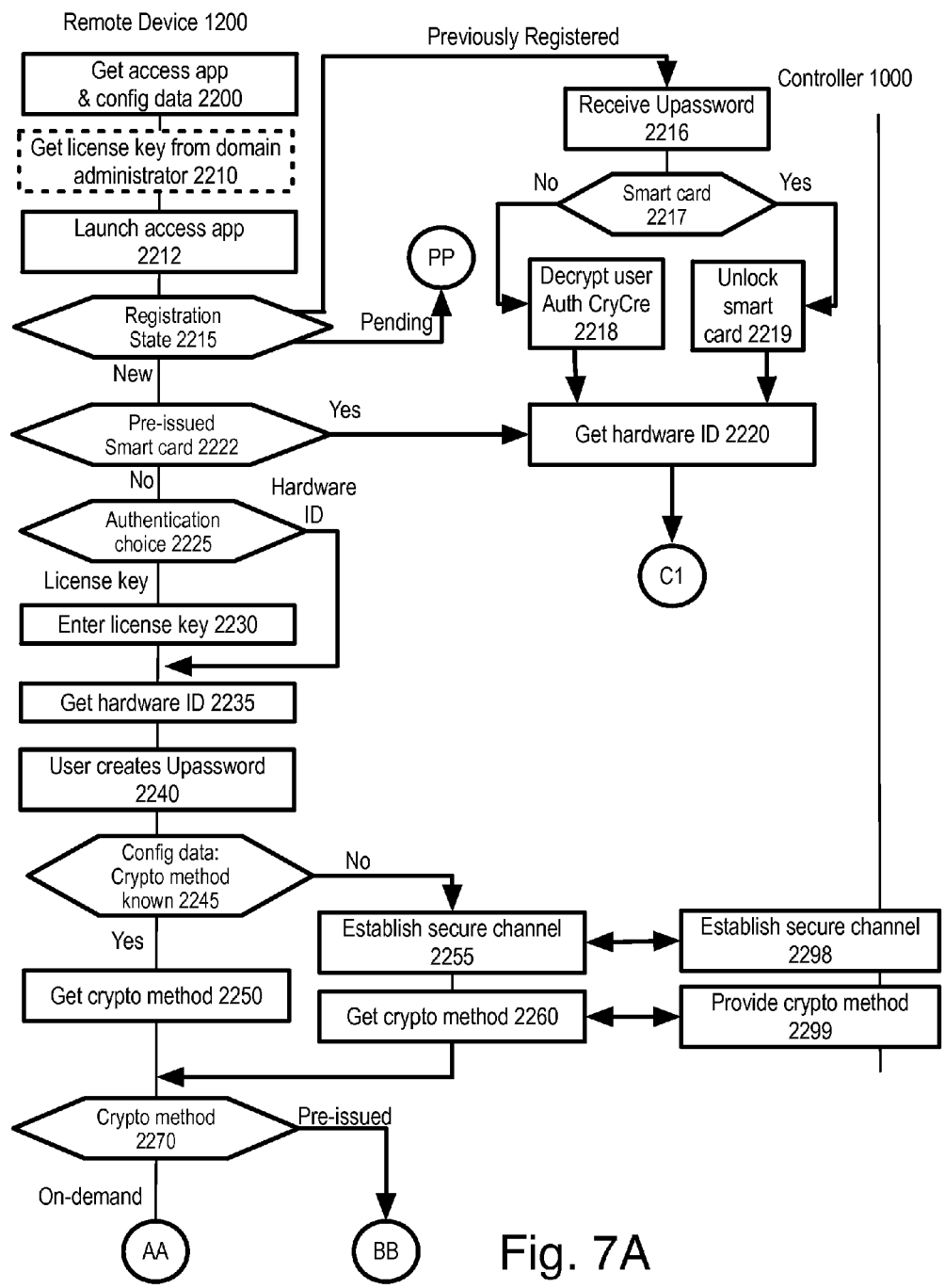
FIGS. 7A-7I are a flowchart showing a registration procedure for a remote device.
Figure 7B:
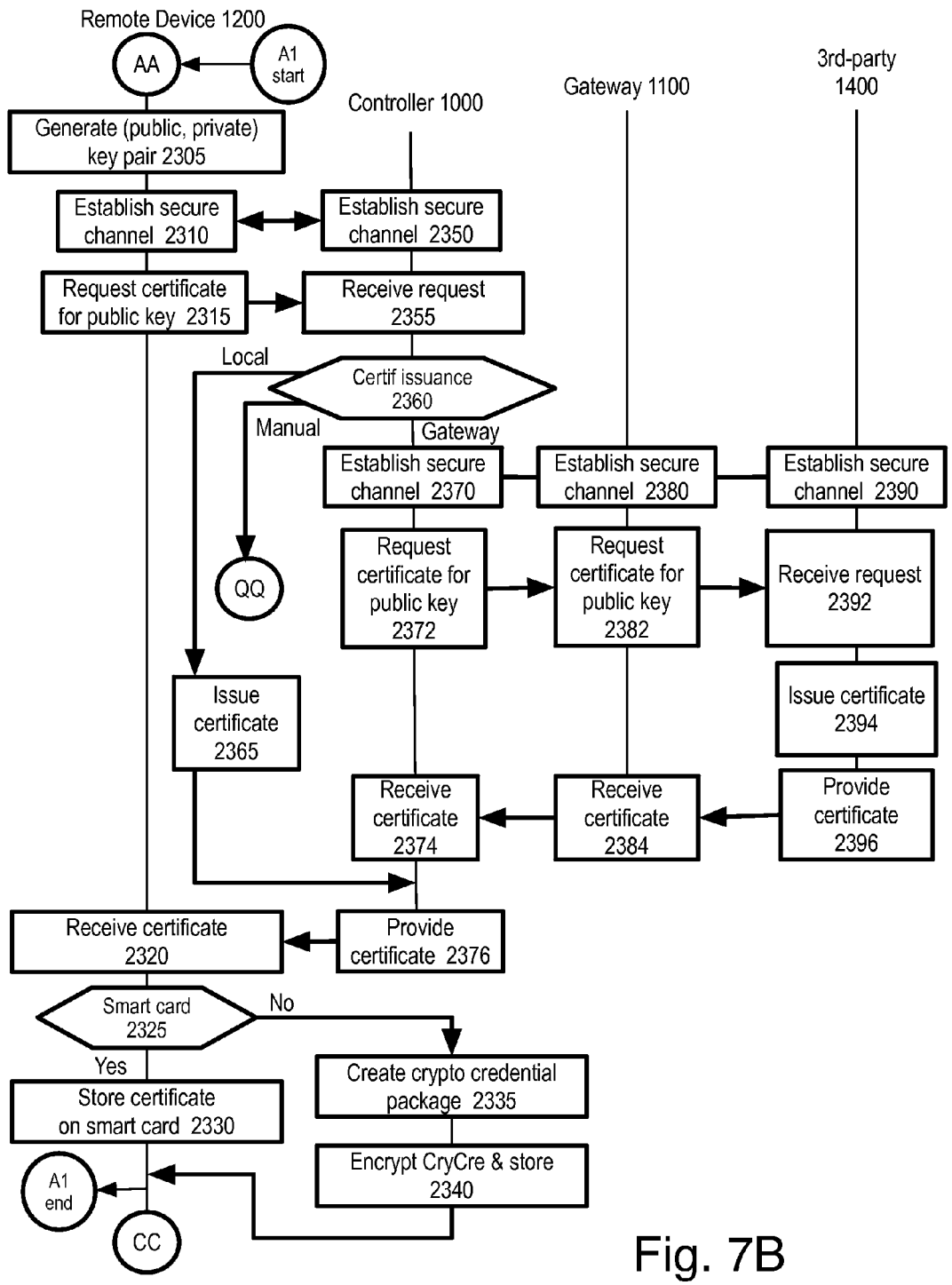
Figure 7C:
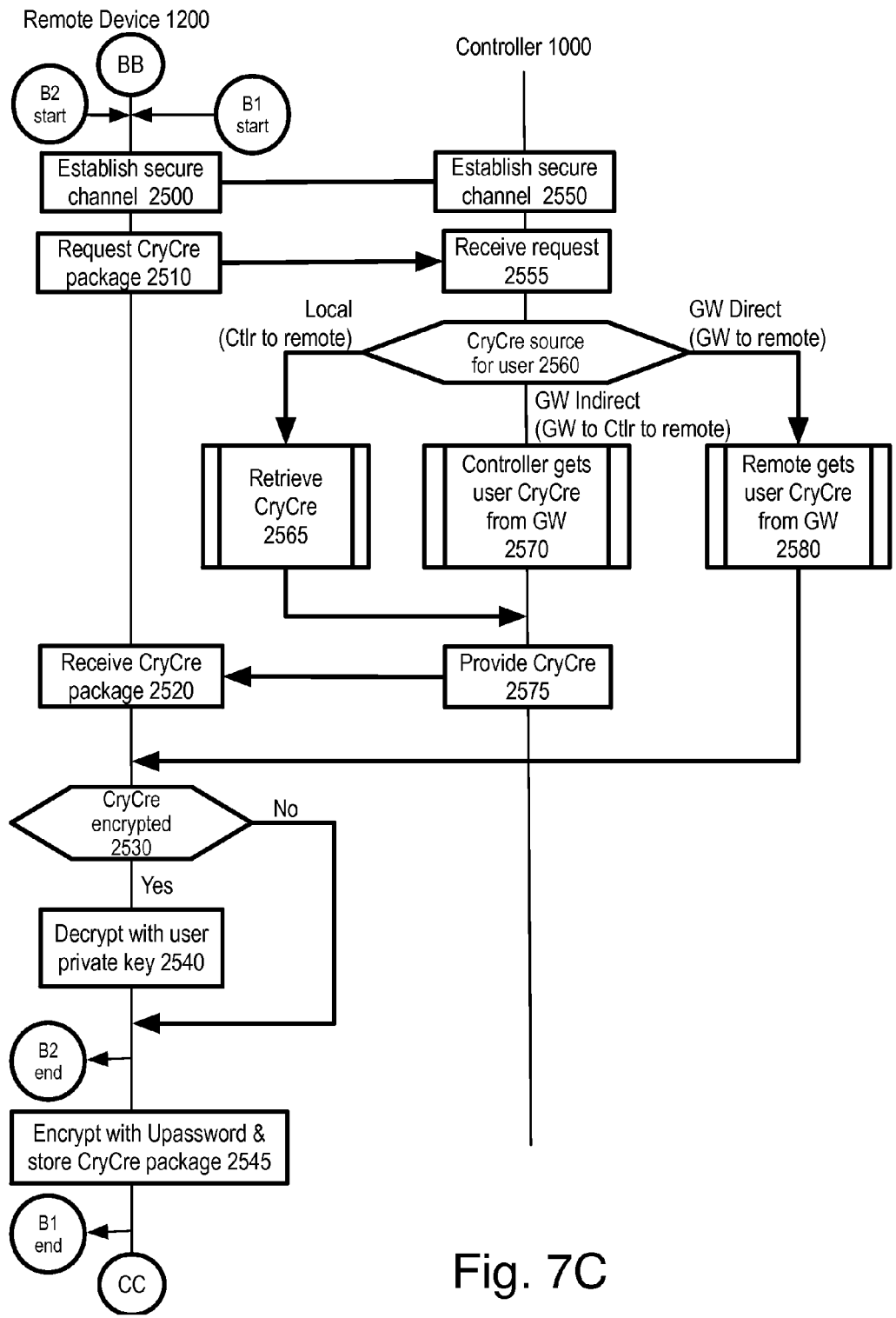
Figure 7D:
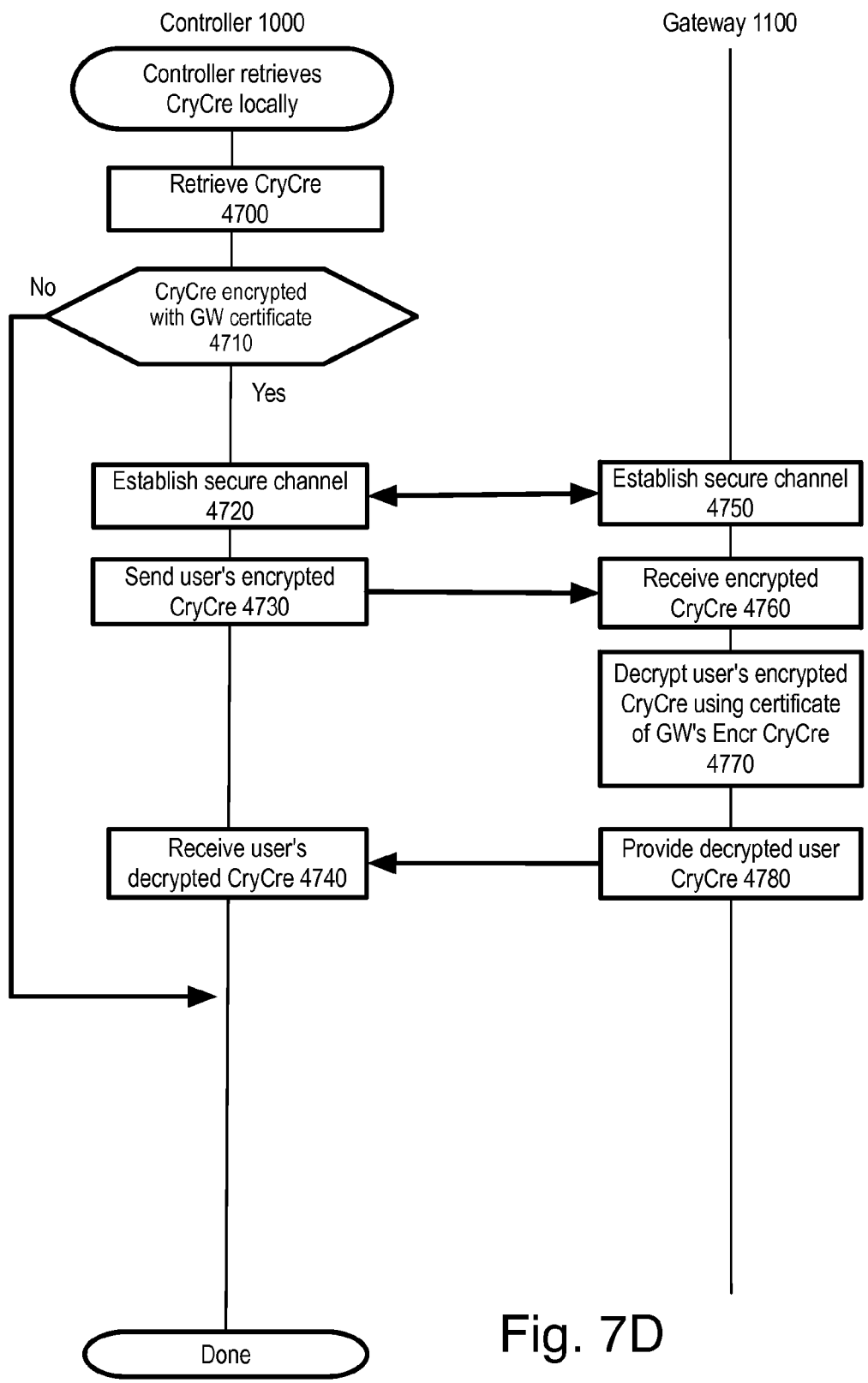
Figure 7E:
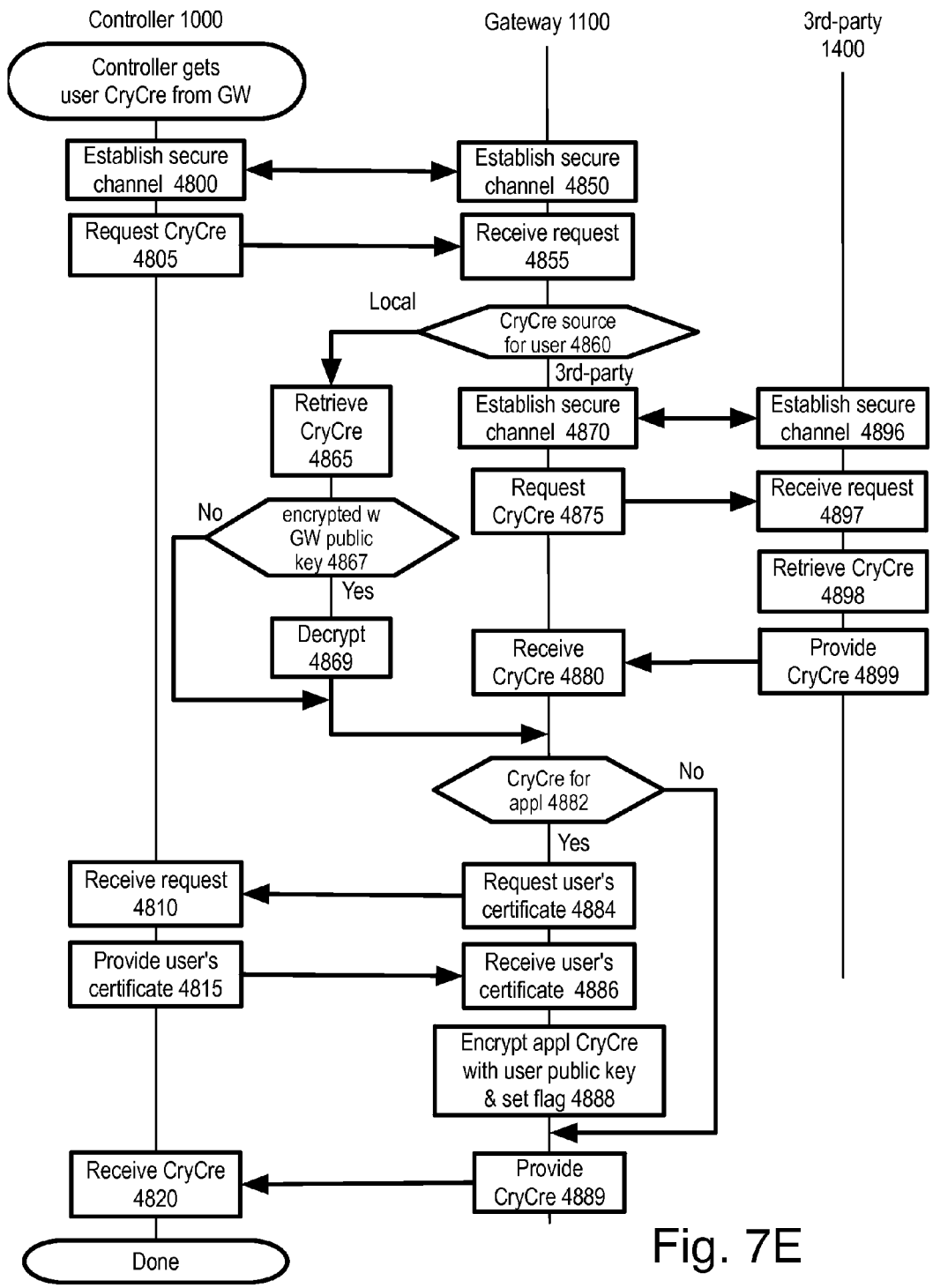
Figure 7F:
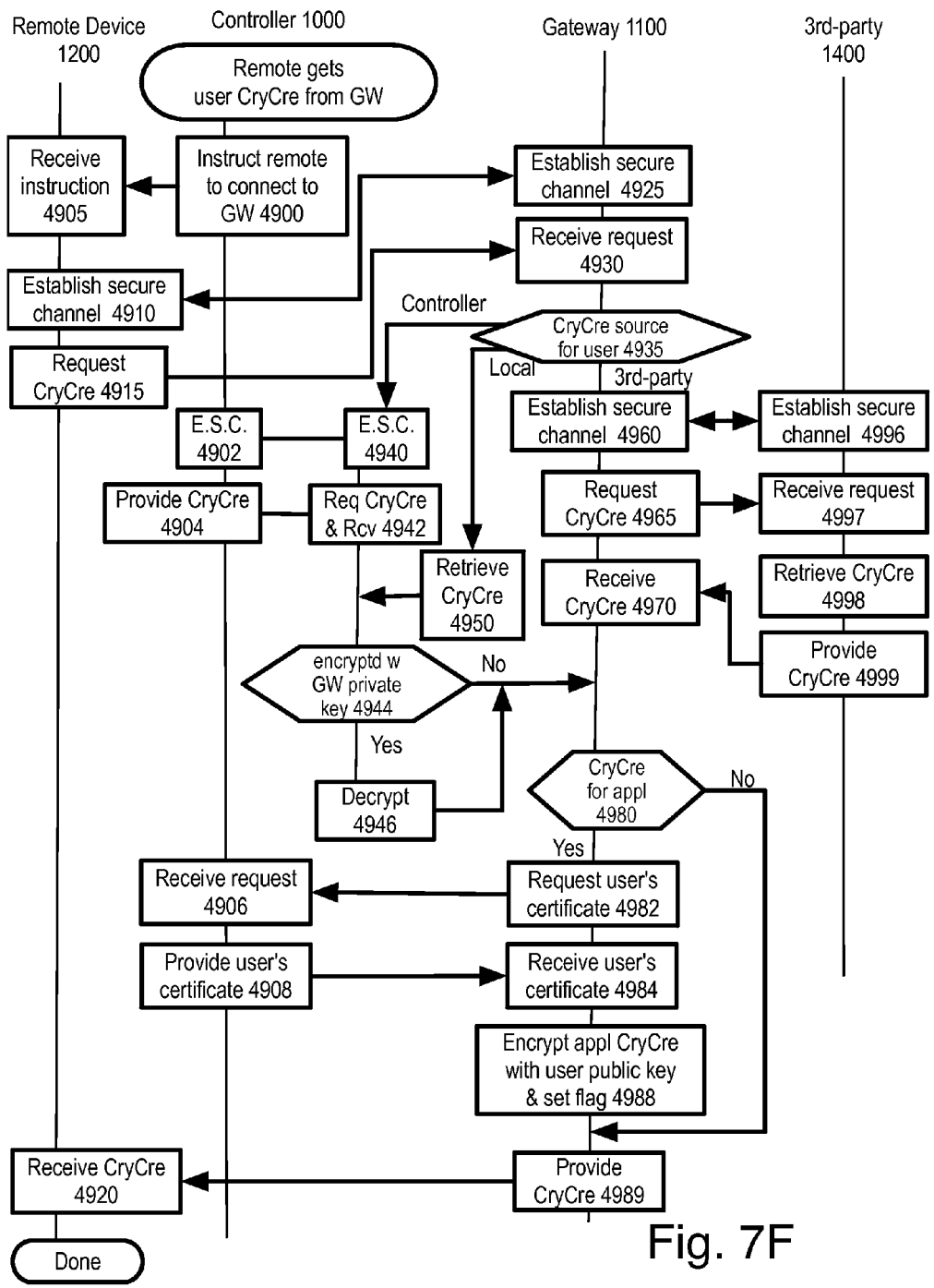
Figure 7G:
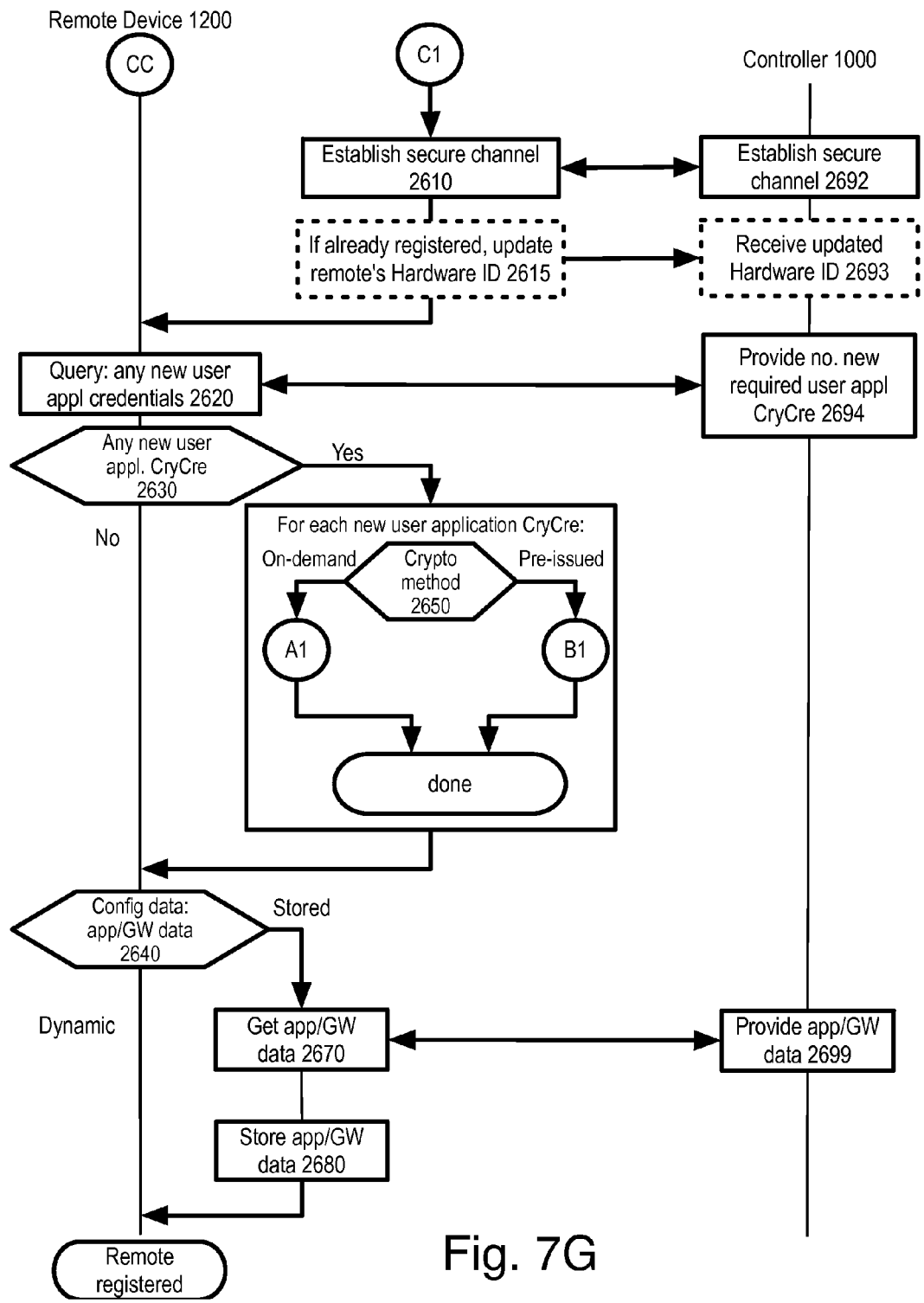

FIGS. 7A-7I show the registration procedure for remote device 1200. FIG. 7A illustrates an initial portion of the user registration procedure. FIG. 7B illustrates an intermediate portion of the registration procedure when user security certificates are created on-demand during registration. FIG. 7C illustrates an intermediate portion of the registration procedure when pre-issued user cryptographic credentials are obtained during registration. FIG. 7G illustrates a final portion of the user registration procedure.

Turning to FIG. 7A, at step 2200, the user gets access application 1220, which includes configuration data 1225 specifying:
- whether the list of entitled applications should be stored in remote device 1200, or should be obtained from controller 1000 for each session;
- whether the method for obtaining security material is known; and
- if the method for obtaining security material is known, which method is used.

The user gets access application 1220 by downloading it from an network site, such as third-party 1400 or controller 1000; by downloading it from an "application store" such as the Apple App Store; by installing it from a file on a removable media; by receiving it as an email attachment; or other suitable technique.

At optional step 2210, the user gets a license key from the domain administrator, via a suitable technique such as email, physical mail or voicemail. See FIG. 6C step 2070 for license key creation. A license key is a long alphanumeric character string, created by a non-sequential algorithm that does not produce recognizable patters, making it impractical to try to predict or guess a valid license key.

At step 2212, the user launches access application 1220, such as by clicking on an icon associated with access application 1220, or other suitable technique.

At step 2215, access application 1220 checks whether this is a new registration attempt registration, a continuation of a pending new registration attempt, or whether remote device 1200 has previously registered.

Figure 7H:
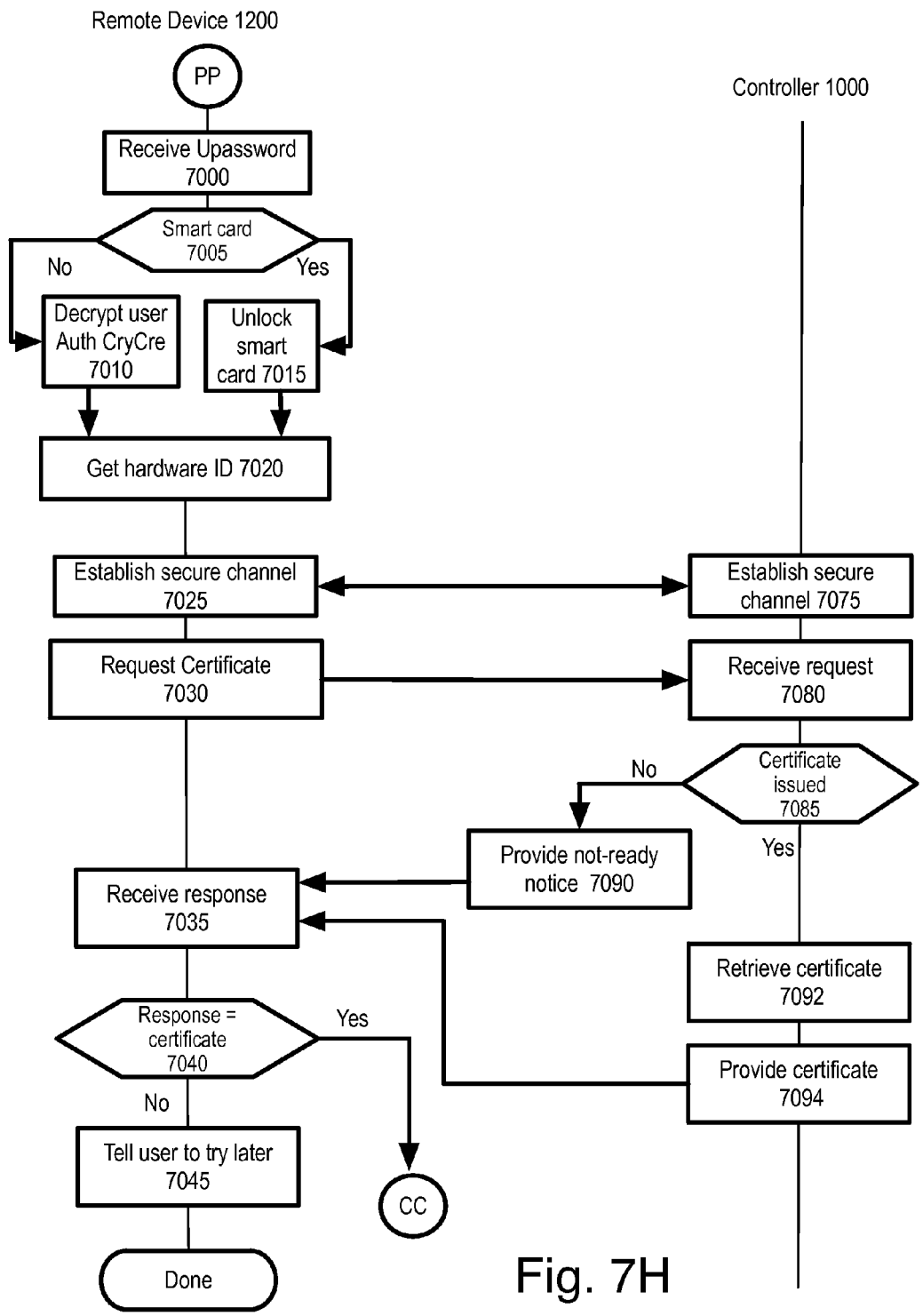

If a continuation of a pending new registration, processing continues at FIG. 7H step 7000.

If previously registered, at step 2216, access application 1220 receives the Upassword from the user. At step 2217, access application 1220 checks whether remote smart card 1290 is present. If not, at step 2218, access application 1220 retrieves the user authentication cryptographic credentials from user crypto credentials 1230 and decrypts them. If smart card 1290 is present, access application 1220 unlocks smart card 1290, as specified in ISO 7816-15. At step 2220, access application 1220 reads the hardware ID from remote device 1200 using the native application programming interface for remote device 1200, and processing continues at FIG. 7G step 2610.

If this is a first registration, at step 2222, access application checks whether a pre-issued remote smart card 1290 is present. If so, processing continues at step 2220 (above). Generally, a blank smart card is prepared for use by setting a user password or personal identification number (PIN), generating cryptographic keys and adding certificate(s) signed by the appropriate certificate authority. Examples of pre-issued smart cards include U.S. government issued Personal Identity Validation (PIV) cards.

If a pre-issued smart card is not present, at step 2225, the user selects whether authentication will proceed with a license key or via a hardware identifier, such as the media address control (MAC) address of remote device 1200, in accordance with the selection instructions received from the domain administrator.

If a license key is to be used, at step 2230, the user enters the license key obtained at step 2215.

At step 2235, access application 1220 reads the hardware identifier from remote device 1200 using the native application programming interface for remote device 1200. Examples of hardware IDs are:
- a media access control (MAC) address according to IEEE standard 802-2001, section 9.2. Example: 1803:734D:E506; and
- a unique device identifier (UDID) on APPLE iPAD tablet and APPLE iPHONE smart phone. Example: f53666693b6bc72e0477d0af5cbd918142fe0e8d3.

At step 2240, the user creates a Upassword for use with access application 1220, for protecting cryptographic credentials. A version of the Upassword, processed through a one-way cryptographic hashing function such as SHA-2, may also be stored on controller 1000 to allow the user access to his/her account settings. The hashing of the original Upassword ensures that only the user knows the original password, and that controller 1000 has no ability to uncover the password.

The Upassword is kept in the memory of remote device 1200, but is never permanently stored therein.

Also at step 2240, the user provides his/her user identification code, received from the domain administrator. For example, the user identification code may be the user's enterprise email address, or the user's Windows domain user ID. Access application 1220 stores the user identification code in configuration data 1225.

At step 2245, access application 1220 reads configuration data 1225 to determine whether the method of obtaining the user's security material is known. If known, at step 2250, access application retrieves the method from configuration data 1225, and processing continues at step 2270

If the method of obtaining the user's security material is not known, at step 2255, access application 1220 establishes a secure channel with controller 1000 (controller-side only authentication). At step 2298, controller 1000 does its part in establishing a secure channel. At step 2260, access application 1220 requests and receives the method of obtaining the user's security material. At step 2299, authorization module 1030 of controller 1000 provides the method.

At step 2270, access application checks which method it should use to obtain the user's security information. If the method is on-demand issuance of a security certificate, processing continues at FIG. 7B step 2305. If the method is to use pre-issued cryptographic credentials, processing continues at FIG. 7C step 2500.

Turning to FIG. 7B, at step 2305, access application 1220 generates a public and private key pair according to a public key cryptography technique such as RSA PKCS#1, elliptic curve cryptography (ECC) PKCS#13, Diffie-Hellman key exchange PKCS#3, or other suitable technique.

At step 2310, access application 1220 establishes a secure channel with authorization module 1030 executing on controller 1000, and at step 2350, controller 1000 does its part towards establishing the secure channel.

At step 2315, access application 1220 requests a security certificate for the public key that it generated at step 2305. At step 2355, authorization module 1030 at controller 1000 receives the request.

At step 2360, authorization module 1030 checks domain data 1050 to determine the source of the security certificate: manual, itself or a third-party.

Figure 7I:
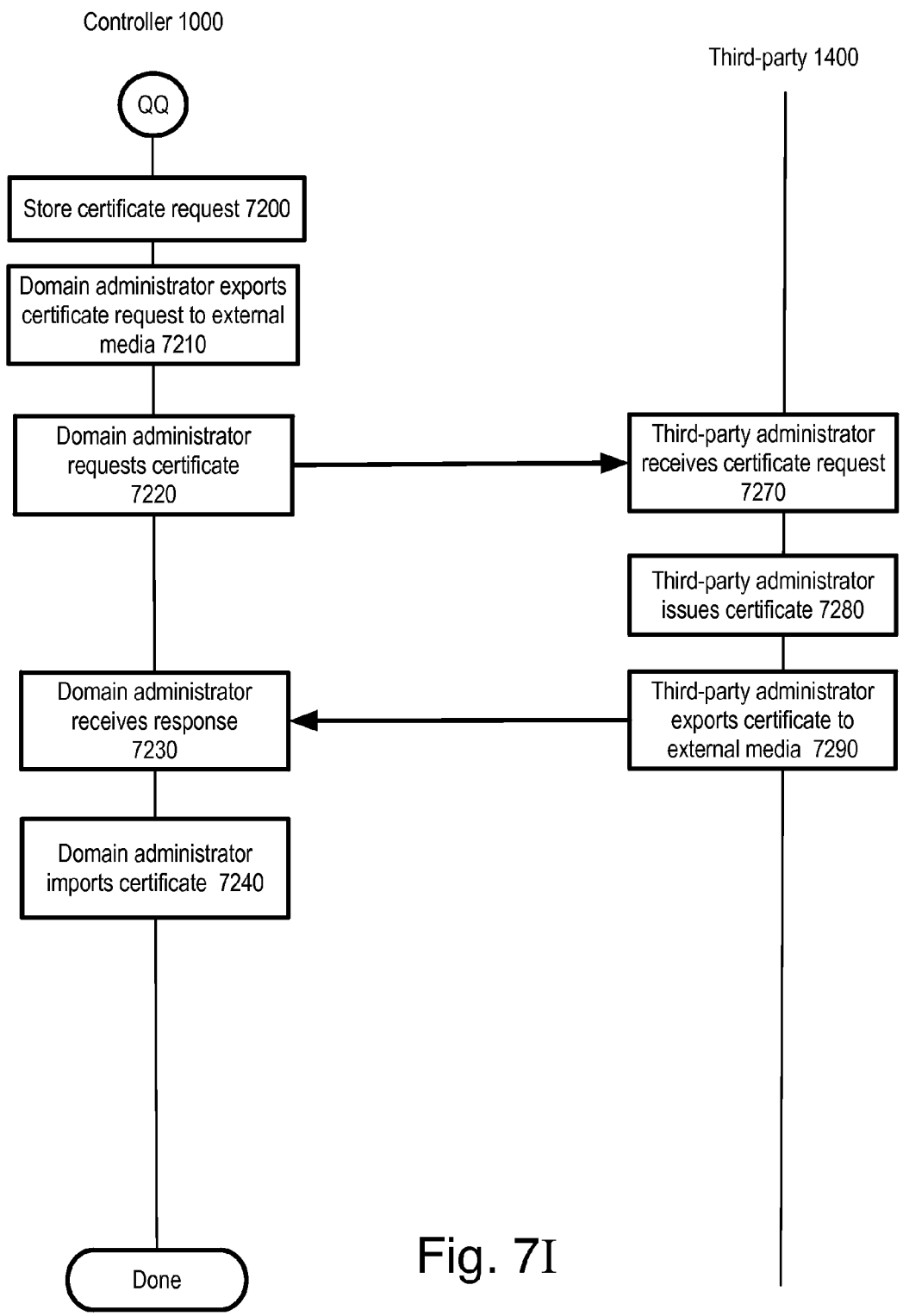

If the source of the security certificate is manual, processing continues at FIG. 7I step 7200.

If the source of the security certificate is itself, then at step 2365, certificate authority 1005 generates a security certificate for the user's public key that is signed by certificate authority 1005. See FIG. 3A. Processing continues at step 2376.

If the source of the security certificate is a third party, then at step 2370, authorization module 1030 establishes a secure channel with authorization module 1120 executing on gateway 1100, which, in turn, at steps 2380 and 2390 establishes a secure channel with third-party 1400.

At step 2372, authorization module 1030 sends a request for a security certificate corresponding to the user's public key to authorization module 1120, which forwards the request to third-party 1400 at step 2382.

At step 2392, third-party 1400 receives the request for a security certificate, and at step 2394, third-party 1400 functions as a certificate authority to issue and sign the security certificate. See FIG. 3B. At step 2396, third-party 1400 provides the security certificate to gateway 1100.

At step 2384, gateway 1100 receives the security certificate from third-party 1400, and forwards it to controller 1000. At step 2374, authorization module 1030 receives the security certificate.

At step 2376, authorization module 1030 provides the security certificate to access application 1220. At step 2320, access application 1220 receives the security certificate.

At step 2325, access application 1220 checks whether remote device smart card 1290 is present. If so, at step 2330, access application 1220 stores the certificate on smart card 1290, and processing continues at FIG. 7G step 2620.

If there is no smart card, at step 2335, access application 1220 creates a user authentication cryptographic credentials package with the just-obtained certificate. At step 2340, access application 1220 encrypts the user authentication cryptographic credentials package using the Upassword and a characteristic of remote device 1200, such as its MAC address, and stores the encrypted cryptographic credentials package in user cryptographic credentials 1230. Processing continues at FIG. 7G step 2620.

Turning to FIG. 7C, at step 2500, access application 1220 establishes a secure channel with authorization module 1030 executing on controller 1000, and at step 2550, controller 1000 does its part towards establishing the secure channel.

At step 2510, access application 1220 requests a cryptographic credentials package. At step 2555, authorization module 1030 executing on controller 1000 receives the request.

At step 2560, authorization module 1030 checks domain data 1050 to determine the source of the user authentication cryptographic credentials package. There are three possibilities for accessing the user authentication cryptographic credentials: controller 1000, a third party via gateway 1100, or instructing remote device 1200 to contact gateway 1100 directly. The third case is attractive to domain administrators that want to minimize the involvement of controller 1000 in their enterprise security.

If the source of the cryptographic credentials package is controller 1000, at step 2565, authorization module 1030 retrieves the cryptographic credentials package from user cryptographic credentials 1070. See FIG. 3C. The double vertical lines at step 2565 indicate this is a procedure, see FIG. 7D. Processing continues at step 2575.

If the source of the cryptographic credentials package is gateway 1100, or a third party via gateway 1100, at step 2570, authorization module 1030 obtains the cryptographic credentials from gateway 1100. See FIGS. 3D-3H. The double vertical lines at step 2570 indicate this is a procedure, see FIG. 7E. Processing continues at step 2575.

If remote device 1200 is to obtain its user authentication cryptographic credentials directly from gateway 1100, then at step 2580 it does so. See FIGS. 3I-3K. The double vertical lines at step 2580 indicate this is a procedure, see FIG. 7F. Processing continues at step 2530.

At step 2575, authorization module 1030 provides the user authentication cryptographic credentials to access application 1220 executing on remote device 1200. At step 2520, access application 1220 receives the user authentication cryptographic credentials.

At step 2530, access application 1220 checks whether the user authentication cryptographic credentials are encrypted. If so, at step 2540, access application 1220 decrypts the user authentication cryptographic credentials using either (i) its encryption private key, if the remote has user encryption cryptographic credentials, or (ii) the private key associated with the user authentication cryptographic credentials. Since the user authentication cryptographic credentials are tagged with an identification of the certificate used for encryption, or the certificate itself, access application 1220 is easily able to determine the appropriate private key to use.

At step 2545, access application encrypts its user authentication cryptographic credentials with the Upassword and a characteristic of remote device 1200, such as its MAC address, and stores in user authentication CryCre 1230. Processing continues at FIG. 7G step 2620.

In FIG. 7D, step 4700, authorization module 1030 of controller 1000 retrieves the user authentication cryptographic credentials from user CryCre 1070.

At step 4710, authorization module 1020 checks whether the user authentication cryptographic credentials were encrypted with the gateway certificate. If not, processing is complete.

If encrypted, at step 4720, authorization module 1030 establishes a secure channel with authorization module 1120 executing on gateway 1100, and at step 4750, gateway 1100 does its part towards establishing the secure channel.

At step 4730, authorization module 1030 sends the encrypted CryCre to gateway 1100. At step 4760, authorization module 1120 receives the encrypted CryCre. At step 4770, authorization module 1120 decrypts the encrypted CryCre using the private key from its gateway encryption cryptographic credentials. It will be recalled that, usually, all gateways in a domain have the same gateway encryption cryptographic credentials. At step 4780, authorization module 1120 sends the decrypted CryCre to authorization module 1030. At step 4740, authorization module 1030 receives the decrypted CryCre, and processing is complete.

In FIG. 7E, at step 4800, authorization module 1030 establishes a secure channel with authorization module 1120 executing on gateway 1100, and at step 4850, gateway 1100 does its part towards establishing the secure channel.

At step 4805, authorization module 1030 requests an authorization cryptographic credentials package for the user. At step 4855, authorization module 1120 receives the request.

At step 4860, authorization module 1120 checks gateway data 1140 to determine the source of the cryptographic credentials package.

If the source of the cryptographic credentials package is itself, at step 4865, authorization module 1120 retrieves the cryptographic credentials package from user cryptographic credentials 1150. At step 4867, authorization module 1120 checks whether the CryCre are encrypted, and if so, at step 4869, decrypts them using the private key from its gateway encryption cryptographic credentials. Processing continues at step 4882.

If the source of the cryptographic credentials package is other than itself, at step 4870, authorization module 1120 establishes a secure channel with third-party 1400, and at step 4896, third-party 1400 does its part towards establishing the secure channel.

At step 4875, authorization module 1120 requests a cryptographic credentials package for the user. At step 4897, third-party 1400 receives the request.

At step 4898, third-party 1400 retrieves the cryptographic credentials package from user CryCre 1420. At step 4899, third-party 1400 provides the cryptographic credentials package to gateway 1100. At step 4880, authorization module 1120 receives the user cryptographic credentials package.

At step 4882, authorization module 1120 checks whether the cryptographic credentials for this user, from steps 4865, 4869, 4880, are user application cryptographic credentials. If not, processing continues at step 4889.

If there are user application cryptographic credentials, then at step 4884, authorization module 1120 requests the user's authentication certificate from controller 1000. At step 4810, authorization module 1030 of controller 1000 receives the request.

At step 4815, authorization module 1030 provides the user authentication certificate. At step 4886, authorization module 1120 receives the user authentication certificate, and extracts the public key from the user authentication certificate.

At step 4888, authorization module 1120 encrypts the user application cryptographic credentials with the public key extracted from the user authentication certificate, sets a flag indicating that this encryption has occurred, and tags the user application cryptographic credentials with a reference to the user authentication certificate from which the public key was extracted, or appends the user authentication certificate to the user application cryptographic credentials.

At step 4889, authorization module 1120 provides the user authentication cryptographic credentials, and if any, the user application cryptographic credentials, to authorization module 1030. In other embodiments, the user encryption cryptographic credentials are also or alternatively provided at step 4889. At step 4820, authorization module 1030 receives the user CryCre, and processing is complete.

At FIG. 7F, step 4900, authorization module 1030 instructs remote device 1200 to ask gateway 1100 for its cryptographic credentials.

At step 4905, access application 1220 executing on remote device 1200 receives the instruction. At step 4910, access application 1220 establishes a secure channel with gateway 1100. At step 4926, gateway 1100 does its part to establish a secure channel.

At step 4915, access application 1220 requests its user cryptographic credentials. At step 4930, authorization module 1120 on gateway 1100 receives the request.

At step 4935, authorization module 1120 uses gateway data 1140 to determine the source of the user cryptographic credentials. There are three possible sources:

controller 1000, corresponding to the case where the controller has encrypted user cryptographic credentials stored therein (that have been encrypted with the public key associated with the gateway encryption cryptographic credentials), and does not know how to decrypt them because the domain administrator prefers that the controller not know, itself, gateway 1100, or third-party 1400.

If the source of the cryptographic credentials package is controller 1000, at step 4940, authorization module 1120 establishes a secure channel with controller 1000, and at step 4902, controller 1000 does its part towards establishing the secure channel. At step 4942, authorization module 1120 requests a cryptographic credentials package for the user, and receives it. At step 4904, controller 1000 receives the request, retrieves the user cryptographic credentials from user CryCre 1070, and provides them to gateway 1100.

At step 4944, authorization module 1120 checks whether the user CryCre have been encrypted with the private key from the gateway encryption certificate. If so, at step 4946, authorization module 1120 decrypts them. Processing continues at step 4980.

If the source of the cryptographic credentials package is gateway 1100, at step 4950, authorization module 1120 retrieves the user cryptographic credentials from user CryCre 1150, and processing continues at step 4944 (see above).

If the source of the cryptographic credentials package is third-party 1400, at step 4960, authorization module 1120 establishes a secure channel with third-party 1400, and at step 4996, third-party 1400 does its part towards establishing the secure channel. At step 4965, authorization module 1120 requests a cryptographic credentials package for the user. At step 4997, third-party 1400 receives the request. At step 4998, third-party 1400 retrieves the cryptographic credentials package from user CryCre 1420. At step 4999, third-party 1400 provides the cryptographic credentials package to gateway 1100. At step 4970, authorization module 1120 receives the user cryptographic credentials package.

Steps 4980, 4982, 4984, 4988, 4906, 4908 of FIG. 7F correspond, respectively, to steps 4882, 4884, 4886, 4888, 4810, 4815 of FIG. 7E, and are not discussed again, for brevity.

At step 4989, authorization module 1120 provides the user authentication cryptographic credentials, and if any, the user application cryptographic credentials, to access application 1220. In some embodiments, the user encryption cryptographic credentials are also or alternatively provided at step 4989. At step 4920, access application 1220 receives the user CryCre, and processing is complete.

In FIG. 7G, at step 2610, access application 1220 establishes a secure channel with controller 1000, and at step 2692, controller 1000 does its part towards establishing the secure channel. At optional step 2615, access application 1220 sends an update message for its hardware ID. At step 2693, authorization module 1030 on controller 1000 receives the update message and applies it to user data 1060, if the policy established by the domain administrator allows. If the policy does not allow storage of a new hardware ID, then the user must completely re-register, or must ask the domain administrator to manually update the hardware ID for remote device 1200.

At step 2620, access application 1220 inquires whether controller 1000 has notice of any new user application cryptographic credentials for the user. During the initial registration, assuming no pre-issued smart card, the user application cryptographic credentials were provided in FIG. 7E step 4884 or FIG. 7F step 4982. Here, when a pre-issued smart card is used or during a subsequent partial registration, there is another opportunity to get new user application CryCre. At step 2694, authorization module 1030 replies with the number of new user application CryCre.

At step 2630, access application 1220 checks whether there are any new application CryCre. If not, processing continues at step 2640.

If there are new application cryptographic credentials, then step 2650 is repeated once for each new application CryCre.

At step 2650, similar to FIG. 7A step 2270, access application checks which method it should use to obtain the CryCre. If the method is on-demand issuance of a security certificate, as indicated by "A1" in a circle, the processing of FIG. 7B is performed. If the method is to use pre-issued cryptographic credentials, as indicated by "B1" in a circle, the processing of FIG. 7C is performed. The difference between A1 and AA is that A1 returns to FIG. 7G, whereas AA continues to CC. The difference between B1 and BB is that B1 returns to FIG. 7G, whereas BB continues to CC.

At step 2640, access application 1220 checks configuration data 1225 to determine whether the identification data for the applications that the user is entitled to use, and the associated gateway network addresses, will be stored in remote device 1200, or will be dynamically obtained from controller 1000 as needed. Dynamic provision is preferred, so that the user does not have to re-register when s/he is entitled to another application. If dynamic, processing is complete and remote device 1200 is registered.

If the applications/gateway address data are to be stored, at step 2670, access application 1220 requests data, and at step 2699, authorization module 1030 provides the applications/gateway address data. A secure channel between access application 1220 and authorization module has already been established, and is used for this transaction. At step 2680, access application 1220 stores the applications/gateway addresses list in configuration data 1225.

Remote device 1200 is now registered.

FIG. 7H steps 7000, 7005, 7010, 7015, 7020 are similar to FIG. 7A steps 2216, 2217, 2218, 2219, 2220 and are not discussed here, for brevity.

At step 7025, access application 1220 establishes a secure channel with authorization module 1030 executing on controller 1000, and at step 7075, controller 1000 does its part towards establishing the secure channel.

At step 7030, access application 1220 requests its certificate. The certificate was originally requested at FIG. 7B step 2360, but since the fulfillment was manual, the registration process was suspended for the certificate to be manually provided. At step 7030, the user is checking whether the certificate has been provided so that s/he can continue registering. At step 7080, authorization module 1030 receives the request.

At step 7085, authorization module 1030 checks user data 1060 to determine if the certificate has been issued and provided. If the certificate has not been issued, at step 7090, authorization module 1030 sends a NOT-READY notice to remote device 1200. Processing continues at step 7035.

If the certificate has been issued, at step 7092, authorization module 1030 retrieves the certificate from user CryCre 1070. At step 7094, authorization module 1030 sends the certificate to remote device 1200.

At step 7035, remote device 1200 receives a response from controller 1000 to its request.

At step 7040, access application 1220 checks whether the response is a certificate or a NOT-READY notice.

If the response is a certificate, processing continues at FIG. 7G step 2620.

If the response is a NOT READY notice, at step 7045, access application 1220 displays instructions to the user to try again later. After an appropriate time period, which may be a few days, the user tries again at FIG. 7A step 2212.

Turning to FIG. 7I, at step 7200, authorization module 1030 executing on controller 1000 stores the certificate request as pending in user data 1060. In practice, the domain administrator may have a predetermined schedule for manually obtaining new user certificates, such as once per week, so it is helpful to store the certificate request as pending. In some embodiments, controller 1000 sends a message to domain administrator that a new request is pending, via email or text message (not shown).

At step 7210, the domain administrator exports the new pending certificate requests to external media, such as removable storage. In practice, the domain administrator is now getting a batch of requests.

At step 7220, the domain administrator manually requests certificates from third-party 1400 to fulfill its new requests for certificates, generally by sending the external media to third-party 1400.

At step 7270, third-party 1400 receives the certificate requests. In practice, a third-party administrator has its own procedure for obtaining new certificate requests, such as in the morning and in the afternoon.

At step 7280, the third-party administrator 7280 issues a certificate for the request using certificate authority 1405. In some cases, third-party administrator 7280 may require the requesting user to appear in person and present a particular form of identification prior to issuing the certificate. It will be understood that this process could easily take days to complete.

At step 7290, the third-party administrator exports the certificate to external media, such as removable storage, and sends the external media to the domain administrator.

At step 7230, the domain administrator receives the certificate. At step 7240, the domain administrator imports the certificate to user CryCre 1070 of controller 1000, and processing is complete.

The operation procedure for the configuration of FIG. 2 will now be discussed. In one case, a secure channel is used. In another case, a non-secure channel is used.

FIGS. 8A-8E show operation of a data session using a secure channel.

At step 3000, the user launches access application 1220 and provides the Upassword created during registration, see FIG. 7A, step 2240.

At step 3005, access application 1220 checks whether remote smart card 1290 is present. If not, at step 3007, access application 1220 retrieves the user authentication cryptographic credentials from user authentication CryCre 1230. If so, at step 3009, access application 1220 unlocks remote smart card 1290.

At step 3010, access application 1220 reads the hardware ID of remote device 1200.

At step 3015, access application 1220 checks configuration file 1225 to determine whether its entitled applications and associated gateway addresses are stored or must be obtained dynamically.

Figure 8A:
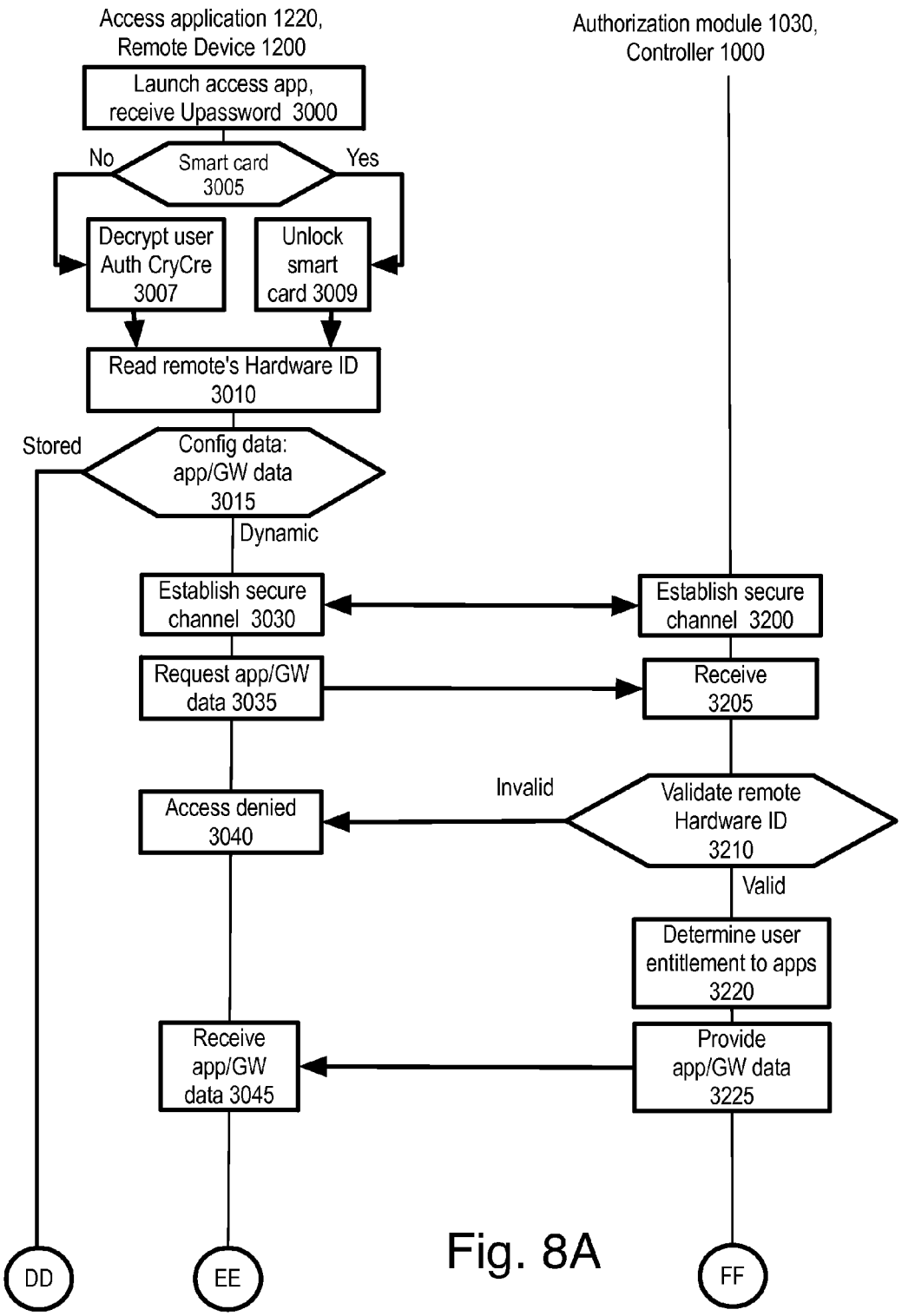
FIGS. 8A-8E are a flowchart showing operation of a data session using a secure channel.
Figure 8B:
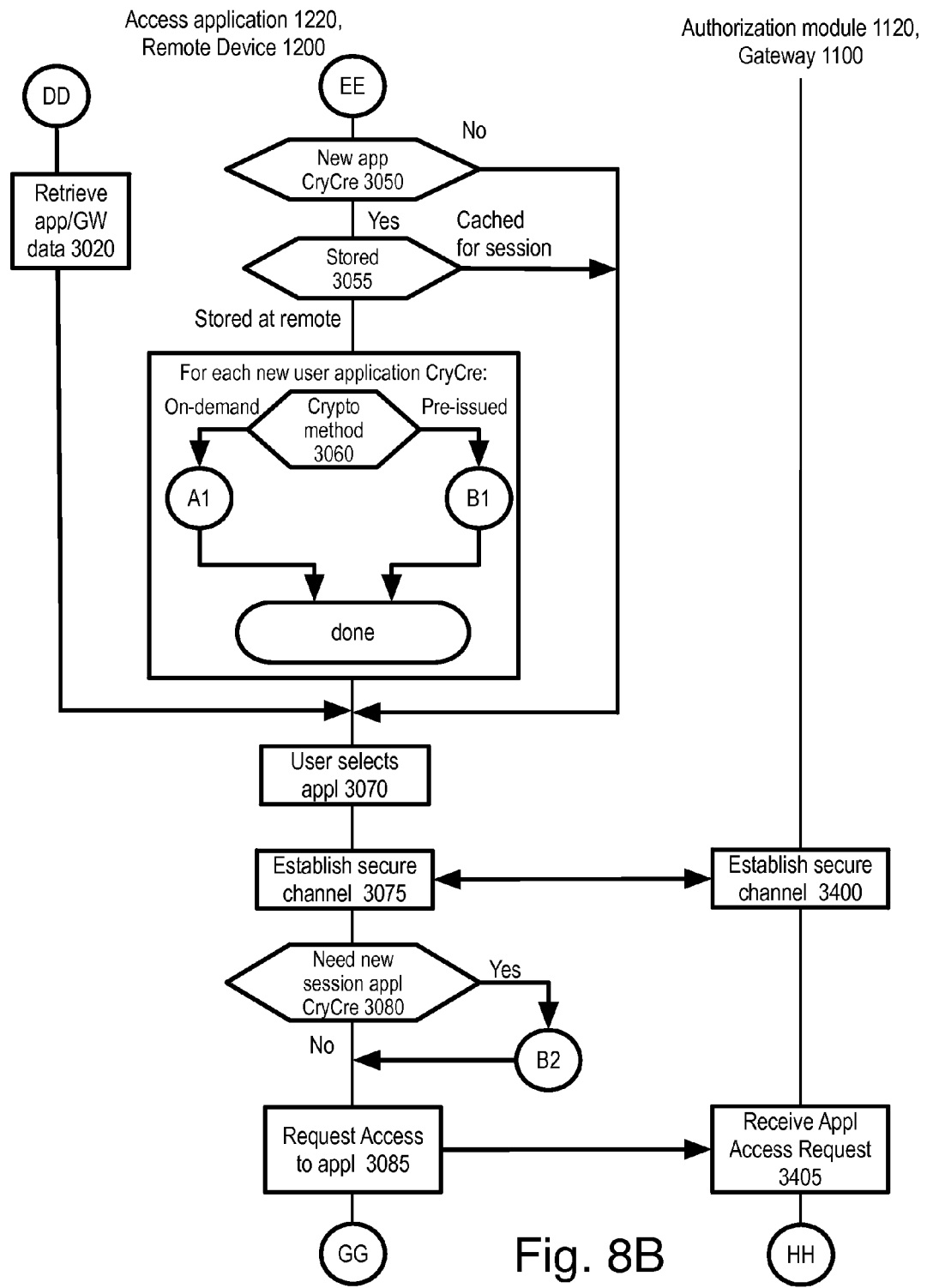

If the application/gateway data is stored, processing continues at FIG. 8B step 3020.

If the application/gateway data must be obtained, at step 3030, access application 1220 establishes a secure channel with authorization module 1030 executing on controller 1000, and at step 3200, controller 1000 does its part towards establishing the secure channel.

At step 3035, access application 1220 requests its application entitlements and associated gateway addresses; the request includes the hardware ID of remote device 1200. At step 3205, authorization module 1030 receives the request.

At step 3210, authorization module 1030 validates the hardware ID of remote device 1200 by comparing the hardware ID in the request to the hardware ID stored for the user. If invalid, authorization module 1030 sends an ACCESS DENIED message to remote device 1200. At step 3040, access application 1220 receives the ACCESS DENIED message and must contact the domain administrator. If valid, at step 3220, authorization module 1030 retrieves the application/gateway data from user data 1060, along with notice of (i) whether any new user application security information is available, (ii) whether the new user application cryptographic credentials should be stored or cached, i.e., used only for one session, and (iii) whether the new application security information is requested on-demand (remote device 1200 generates a public/private key pair and requests a certificate) or pre-issued cryptographic credentials are requested.

At step 3225, authorization module 1030 provides the application/gateway data to remote device 1200. At step 3045, access application 1220 receives the list of application addresses. Processing continues at FIG. 8B step 3050.

At FIG. 8B, step 3020, access application 1220 retrieves its application entitlements and associated gateway addresses from configuration file 1225. Processing continues at step 3070.

At step 3050, access application 1220 checks the notice of whether any new application cryptographic credentials are required, received at FIG. 8A step 3225. If no new application cryptographic credentials are required, processing continues at step 3070.

If the notice indicates new application cryptographic credentials are required, at step 3055, access application 1220 checks whether the new user application security data should be stored or cached. If cached, processing continues at step 3070.

If the notice indicates that the new application security information should be stored, then step 3060 is repeated once for each new application cryptographic credential.

At step 3060, similar to FIG. 7A step 2270, access application checks which method it should use to obtain the CryCre. If the method is on-demand issuance of a security certificate, as indicated by "A1" in a circle, the processing of FIG. 7B is performed. If the method is to use pre-issued cryptographic credentials, as indicated by "B1" in a circle, the processing of FIG. 7C is performed.

At step 3070, the user selects the application that s/he wishes to use, such as application 1310 executing on application server 1300, typically via a graphical user interface provided by access application 1220 on remote device 1200.

At step 3075, access application 1220 establishes a secure channel with authorization module 1120 executing on gateway 1100, and at step 3400, gateway 1100 does its part towards establishing the secure channel.

At step 3080, access application 1220 determines, from step 3045, whether it needs new cached session-only application cryptographic credentials for its desired use of the selected application. If so, as indicated in FIG. 8B by "B2" in a circle, the processing of FIG. 7C is performed except that step 2545 is not performed, and processing returns to FIG. 8B instead of going to CC. In an alternate embodiment (not shown), access application 1220 generates a public/private key pair and requests a certificate on-demand, i.e., the processing of FIG. 7B, creating ephemeral credentials for use only during the session.

At step 3085, access application 1220 sends a request for access to the selected application to gateway 1100. At step 3405, authorization module 1120 receives the request. Processing continues at FIG. 8C step 3410, or FIG. 8D step 3410.

Figure 8C:
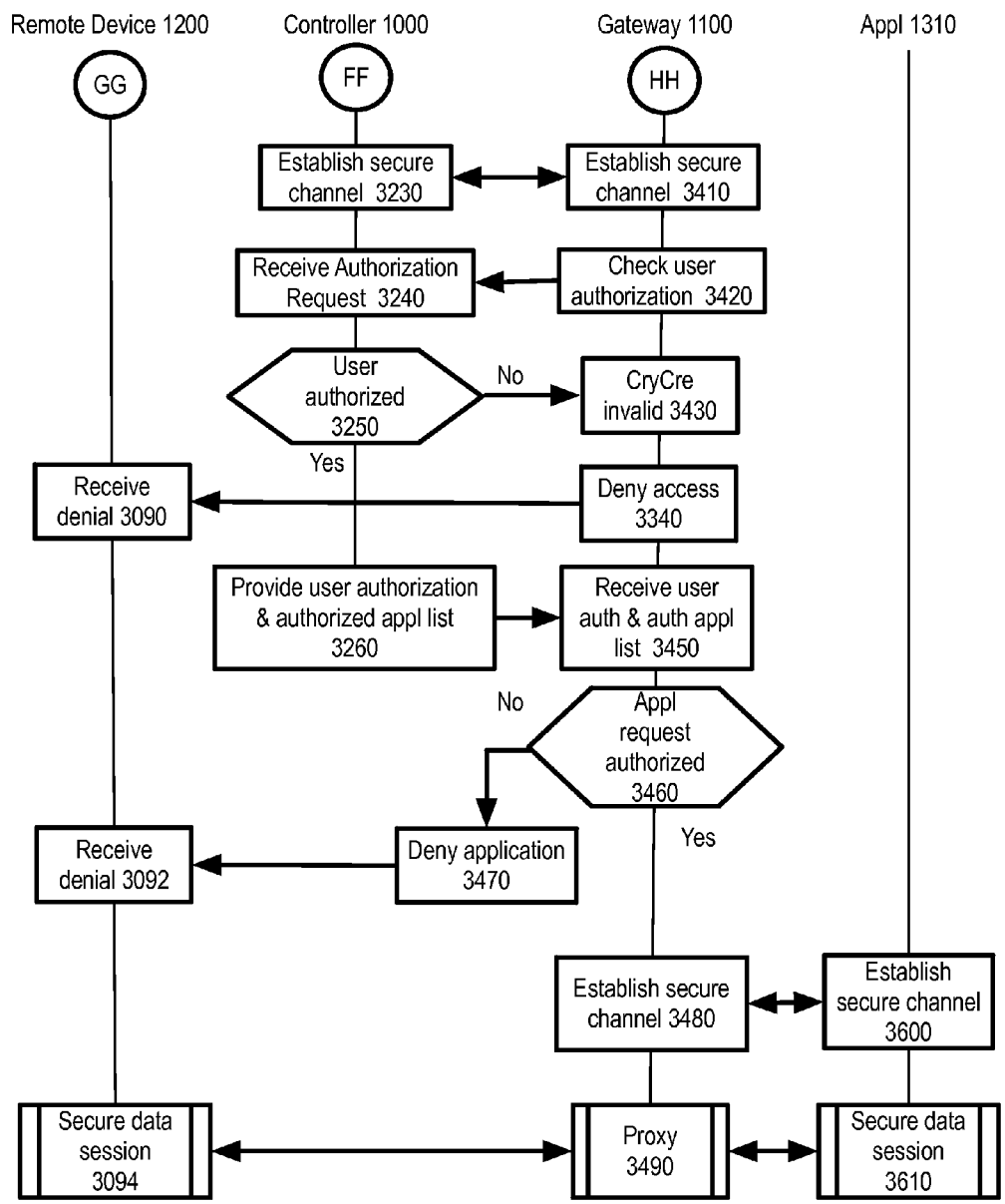

FIG. 8C shows one embodiment of subsequent processing, in which (i) gateway 1100 receives from controller 1000 a list of applications the user is entitled to access as part of the authorization of that user by controller 1000, and by referring to the list, gateway 1100 determines whether an authorized user is entitled to access a particular application, and (ii) gateway 1100 dynamically establishes a secure channel to the selected application.

Figure 8D:
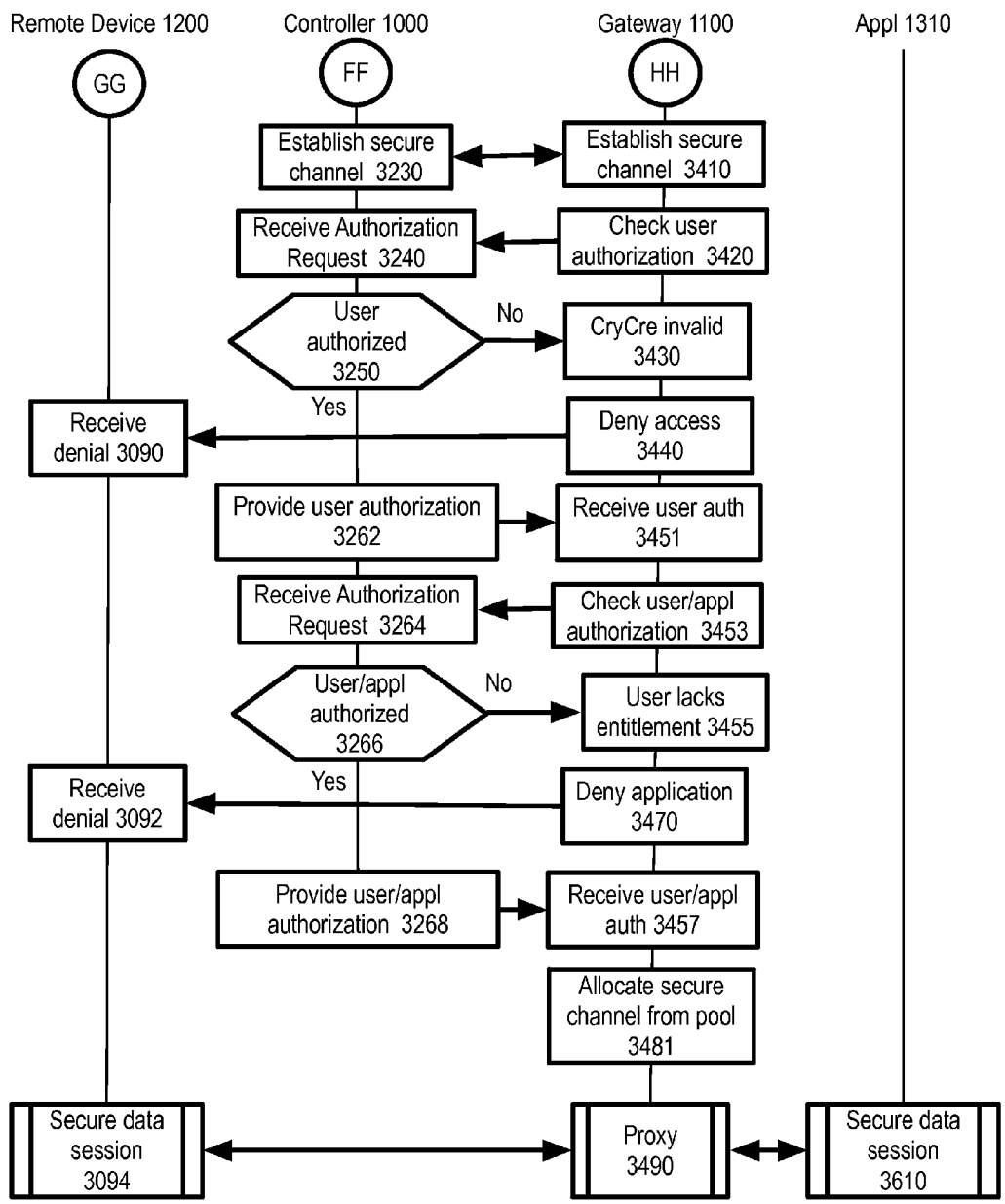

FIG. 8D shows an alternative embodiment of subsequent processing, in which (i) gateway 1100 asks controller 1000 to authorize a user, and then gateway 1100 asks controller 1000 to check whether an authorized user is entitled to access a particular application, and (ii) gateway 1100 uses a secure channel to the selected application from the pool that was created during set-up.

Turning to FIG. 8C, at step 3410, authorization module 1120 executing on gateway 1100 establishes a secure channel with authorization module 1030 executing on controller 1000, and at step 3230, controller 1000 does its part towards establishing the secure channel.

At step 3420, authorization module 1120 sends a request to authorization module 1030 to determine whether the user of remote device 1200 is authorized to use any applications. At step 3240, authorization module 1030 receives the request.

At step 3250, authorization module 1030 checks user data 1060 to determine whether the user is authorized to use any applications. The check includes examining the general access policy for the user, and any specific restrictions for use of this application. The check also includes examining certificate revocation data 1090 for certificates issued by controller 1000, and checking certificate revocation data 1410 (via a process not shown for brevity) for certificates issued by third-party 1400.

If the user is not authorized, i.e., the user's cryptographic credentials are incorrect, such as because they have been revoked or an unauthorized user is trying to gain access, then authorization module 1030 sends a NOT-AUTHORIZED message to authorization module 1120. At step 3430, authorization module 1120 receives the NOT-AUTHORIZED message. At step 3340, authorization module 1120 sends an ACCESS DENIED message to remote device 1200. At step 3090, access application 1220 receives the ACCESS DENIED message, and processing is complete. The user must contact the domain administrator to determine how to re-register.

If the user is authorized, then at step 3260, authorization module 1030 retrieves the applications—and corresponding gateway addresses—that the user is entitled to access from user data 1060, and provides this list to gateway 1100. At step 3450, authorization module 1120 receives the applications/addresses data.

At step 3460, authorization module 1120 checks whether the selected application received from the user at FIG. 8B step 3070 matches one of the entitled applications received from controller 1000 at step 3450.

If the selected application does not match one of the entitled applications, then at step 3470, authorization module 1120 sends an APPLICATION DENIED message to remote device 1200. At step 3092, access application 1220 receives the APPLICATION DENIED message, and processing is complete. The user must contact the domain administrator to determine how to properly become entitled to use the application.

If the selected application matches one of the entitled applications, then at step 3480, authorization module 1120 establishes a secure channel with application 1310 executing on application server 1300, and at step 3600, application server 1300 does its part towards establishing the secure channel.

At step 3610, application 1310 is used by the user. Data to/from application 1310 is transmitted on the application's secure channel to gateway 1100. The vertical lines on the box at step 3610 indicate this is a procedure. See FIG. 8E step 5600.

At step 3094, the user uses application 1310. Data to/from the user is transmitted on the user's secure channel to gateway 1100. The vertical lines on the box at step 3610 indicate this is a procedure. See FIG. 8E step 5000.

At step 3490, authorization module 1120 serves as a proxy for the data session between the user and application 1310, receiving data on one of the (user, application) secure channels and transmitting it on the other of the (user, application) secure channels. The vertical lines on the box at step 3610 indicate this is a procedure. See FIG. 8E step 5400.

Turning to FIG. 8D, for brevity, only the differences from FIG. 8C are discussed.

A first difference is that in FIG. 8C, at step 3240, controller 1000 sends a list of entitled applications and their addresses to gateway 1100. When there are a large number of applications, this can become unwieldy. Instead, in FIG. 8D, after controller 1000 determines that a user is authorized, gateway 1100 asks the controller if the user is authorized to use the selected application. The fact that the gateway has a two-part authorization request protocol with the controller in FIG. 8D results in better security than the one-part authorization request protocol of FIG. 8C.

At FIG. 8D step 3262, if the user is authorized, authorization module 1030 provides user authorization to gateway 1100. At step 3451, authorization module 1120 receives the user authorization.

At step 3453, authorization module 1120 asks controller 1000 whether the user is entitled to use the selected application, i.e., application 1310. At step 3264, authorization module 1030 receives the request.

At step 3266, authorization module 1030 checks user data 1060 and determines whether the user is authorized to use application 1310.

If the user is not authorized to use application 1310, authorization module 1030 sends an APPLICATION DENIED message to gateway 1100. At step 3455, authorization module 1120 receives the APPLICATION DENIED message. Processing continues at step 3470 as in FIG. 5B.

If the user is authorized to use application 1310, at step 3268, authorization module 1030 notifies gateway 1100 that the user is entitled. At step 3457, authorization module receives the notice that the user is entitled to use application 1310.

A second difference is that in FIG. 8C, at step 3480, gateway 1100 establishes a secure channel to application 1310. This can be time-consuming, possibly leading to time-out delays at remote device 1200. Instead, in FIG. 8D, gateway 1100 uses a pre-established channel to application 1310.

At step 3481, authorization module 1120 allocates one of the channels from the pool established in FIG. 6D, step 2160. Processing continues at steps 3094/3490/3610 as in FIG. 8C.

Figure 8E:
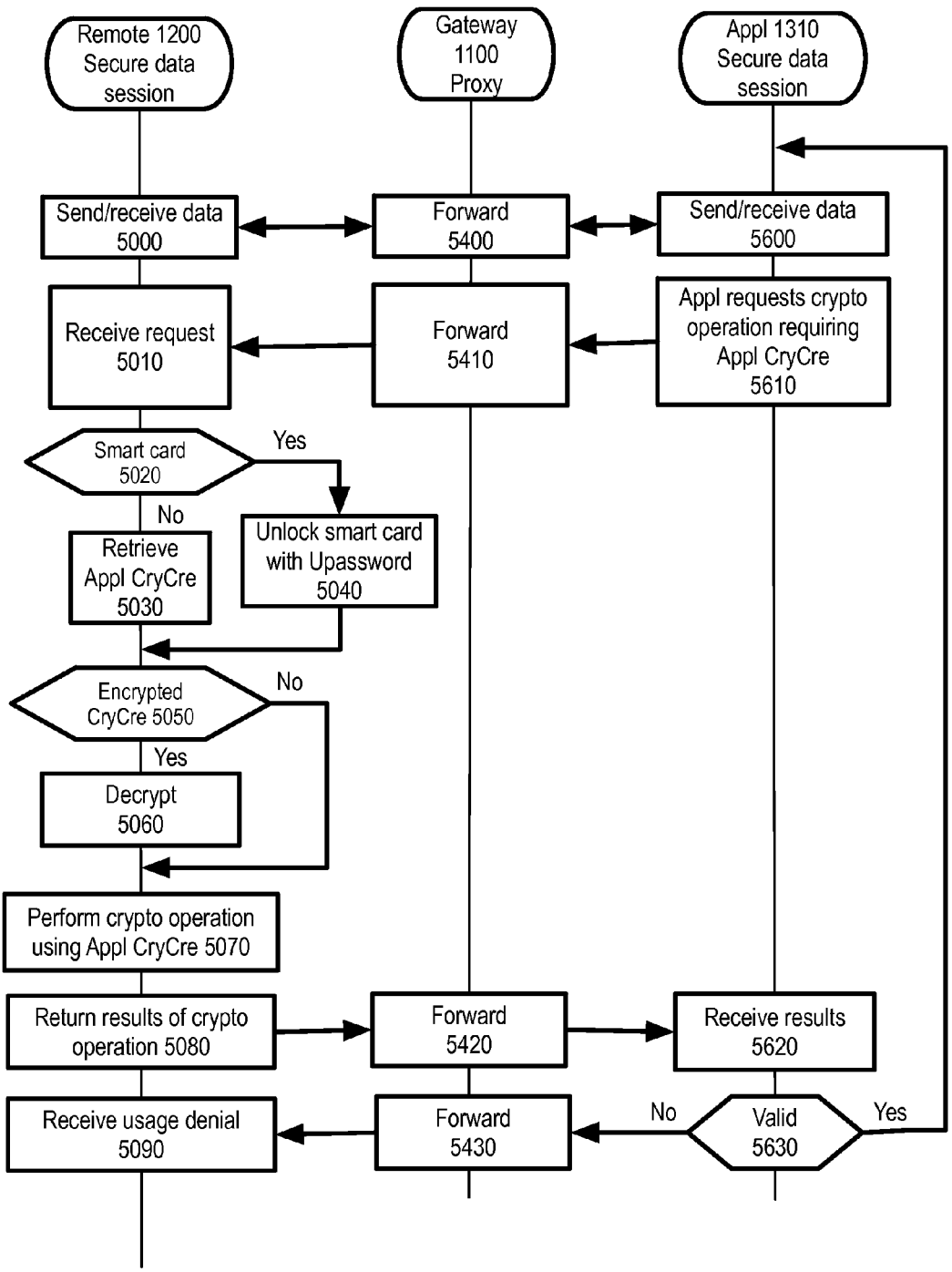

FIG. 8E shows a secure data session in which application 1310 requires that remote device 1200 demonstrate its possession of user application cryptographic credentials.

At step 5000, remote 1200 sends data to, and receives data from, application 1310. At step 5600, application 1310 receives data from, and sends data to, remote 1200. At step 5400, gateway 1100 functions as a proxy for the sending and receiving between remote 1200 and application 1310.

At step 5610, application 1310 requests that remote device 1200 perform a cryptographic operation using its user application cryptographic credentials. At step 5410, gateway 1100 forwards this request to remote device 1200. At step 5010, remote device 1200 receives the request.

At step 5020, access application 1220 executing on remote device 1200 checks whether a remote smart card 1290 is present. If not, at step 5030, access application 1220 retrieves the user application cryptographic credentials from user application CryCre 1250. If remote smart card 1290 is present, access application 1220 unlocks smart card 1290 with the Upassword and obtains the user application cryptographic credentials.

At step 5050, access application 1220 checks whether the user application cryptographic credentials are encrypted. If so, at step 5060, access application 1220 decrypts the user application cryptographic credentials, per the attached tags, typically using the user authentication cryptographic credentials, or if present, the user encryption cryptographic credentials.

At step 5070, access application 1220 uses the user application cryptographic credentials to perform the cryptographic operation requested by application 1310.

At step 5080, access application 1220 sends the results of the cryptographic operation to gateway 1100. At step 5420, gateway 1100 forwards the results to application 1310. At step 5620, application 1310 receives the results.

At step 5630, application 1310 determines whether the results are valid, that is, the results demonstrate that remote device 1200 possesses the appropriate user application cryptographic credentials. If not, application 1310 sends a USAGE DENIED message to gateway 1100. At step 5430, gateway 1100 forwards the message to remote device 1200. At step 5090, remote device 1200 receives the USAGE DENIED message, and may need to contact the domain administrator if use of the protected application function is needed, or if application 1310 also halts due to the invalid results. In other embodiments, the user may continue using application 1310 except for the protected application function If the results demonstrate that remote device 1200 possesses the user application cryptographic credentials, then application 1310 proceeds to step 5600 and continues allowing remote device 1200 to use application 1310.

Figure 9A:
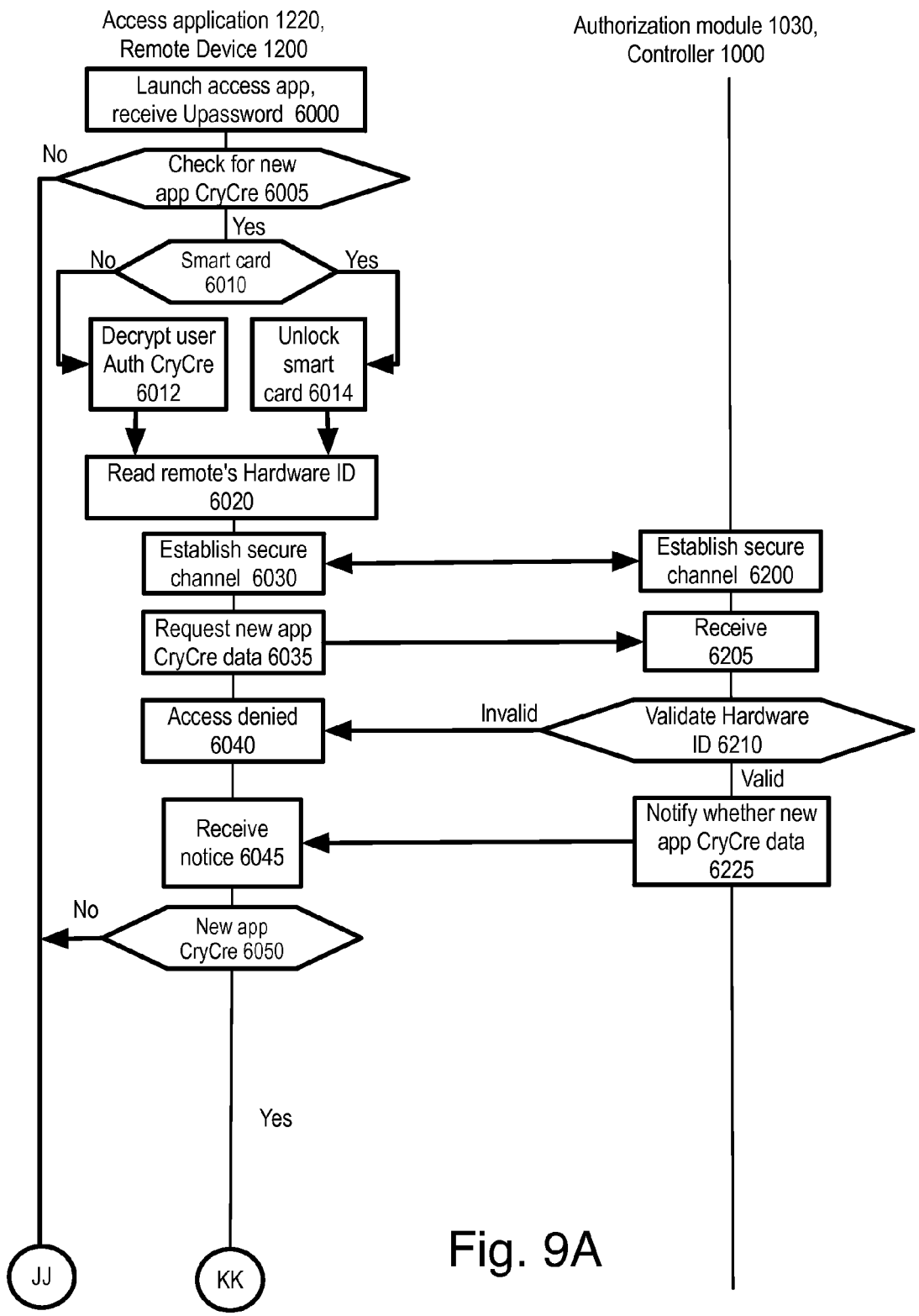
FIGS. 9A-9C are a flowchart showing operation of a data session using a non-secure channel.
Figure 9B:
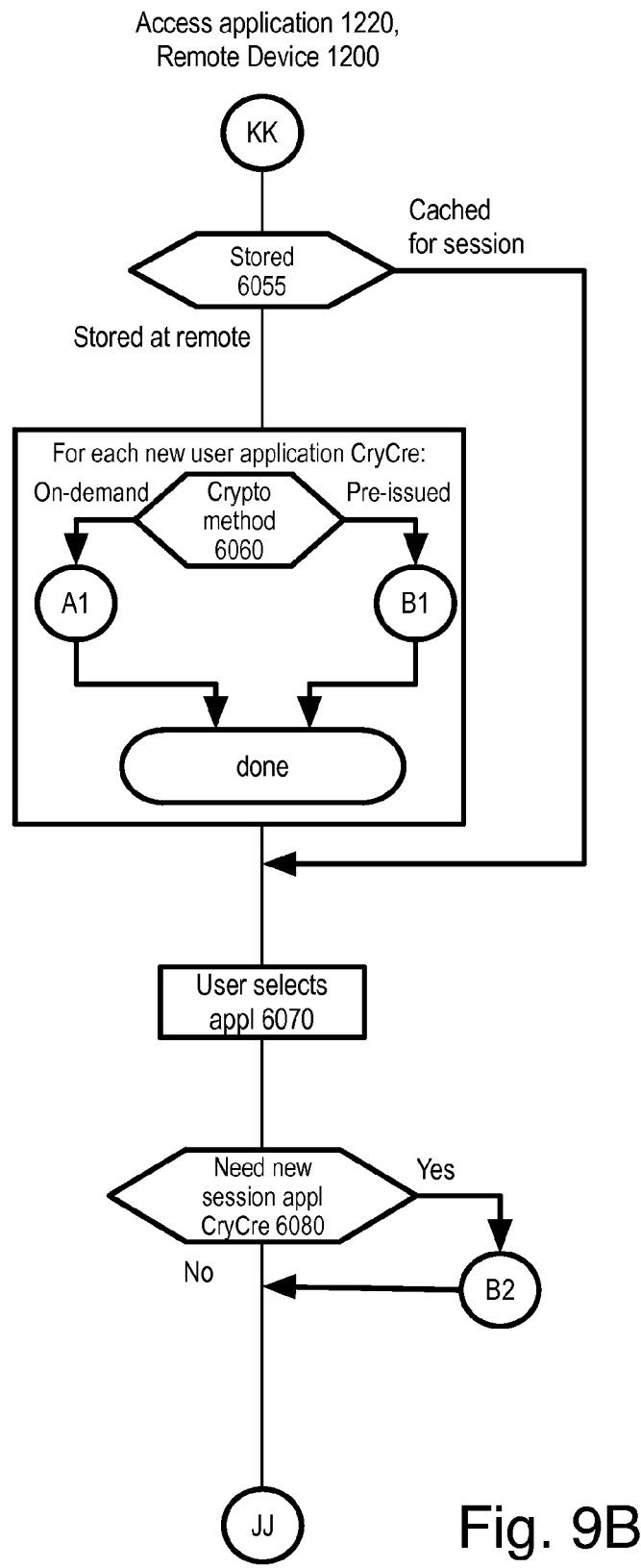
Figure 9C:
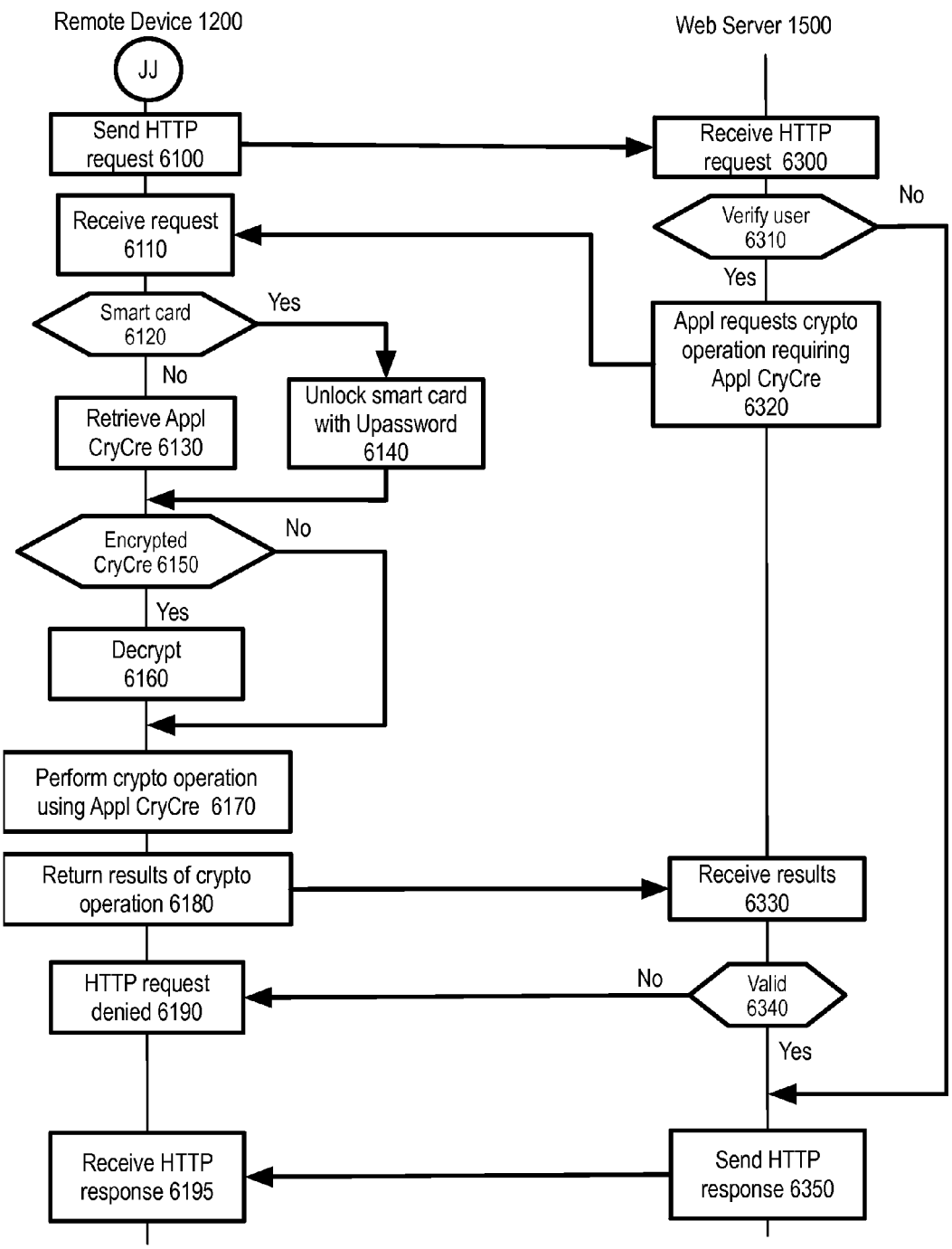

FIGS. 9A-9C show operation of a data session using a non-secure channel. When steps are similar to previously discussed steps, the steps are not discussed here for brevity.

FIG. 9A step 6000 is similar to FIG. 8A step 3000.

At step 6005, access application 1220 checks configuration data 1225 to determine whether it should check for new cryptographic credentials, that is, whether it stores its application entitlements or receives them dynamically. This is a bit like step 3015 of FIG. 8A, except that there is no gateway address associated with the application entitlements, since either a non-secure channel is used or remote device 1200 establishes a secure channel without using gateway 1100.

Depending on the domain administrator's preference, the configuration data for remote device 1200 can be set to cause remote device 1200 to combine its requests for new user application cryptographic credentials for secure data sessions and non-secure data sessions, or to cause remote device 1200 to make separate requests, as shown in FIGS. 8A and 9A.

If access application 1220 determines that it should not check for new user application cryptographic credentials, then processing continues at FIG. 9C step 6100.

If access application 1220 determines that it should check for new application cryptographic credentials, then processing continues at step 6010.

Steps 6010, 6012, 6014, 6020 are similar to FIG. 8A steps 3005, 3007, 3009, 3010.

At step 6030, access application 1220 establishes a secure channel with authorization module 1030 executing on controller 1000, and at step 6200, controller 1000 does its part towards establishing the secure channel.

At step 6035, access application 1220 requests its new application cryptographic credentials; the request includes the hardware ID of remote device 1200. At step 6205, authorization module 1030 receives the request.

At step 6210, authorization module 1030 validates the hardware ID of remote device 1200 by comparing the hardware ID in the request to the hardware ID stored for the user. If invalid, authorization module 1030 sends an ACCESS DENIED message to remote device 1200. At step 6040, access application 1220 receives the ACCESS DENIED message, and must contact the domain administrator. If valid, at step 6225, authorization module 1030 sends a notice of (i) whether any new user application security information is available, (ii) whether the new user application security data should be stored or cached, i.e., used only for one session, and (iii) whether the new application security information is dynamically provided as certificates or pre-stored cryptographic credentials.

At step 6045, access application 1220 receives the notice. At step 6050, access application 1220 checks the notice of whether any new application security information is available. If no new security information is available, processing continues at FIG. 9C step 6100.

If the notice indicates new application security information is available, processing continues at FIG. 9B step 6055.

At FIG. 9B step 6055, access application 1220 checks whether the new user application security data should be stored or cached. If cached, processing continues at step 6070.

If the notice indicates that the new application security information should be stored, then step 6060 is repeated once for each new application security information. Step 6060 is similar to FIG. 8B step 3060.

Step 6070 is similar to FIG. 8B step 3070.

Step 6080 is similar to FIG. 8B step 3080.

Processing continues at FIG. 9C step 6100.

At FIG. 9C step 6100, remote device 1200 sends a request to application 1510 executing on web server 1500 using network 999 for a non-secure channel. In other embodiments, remote device 1200 establishes a secure channel with web server 1500 via a technique outside the scope of the instant application. At step 6300, application 1510 receives the request.

An instance of an application that generally permits non-secure use, but sometimes requires that a user verify their identity to permit use, is a medical chat board, where anyone can read the chat board posting, and anyone can post a question, but only a verified doctor can post an answer.

At step 6310, application 1510 checks whether it needs to verify the identity of the user that made the request. If not, processing continues at step 6350.

If the user's identity needs to be verified, at step 6320, application 1510 sends a request for a cryptographic operation to remote device 1200. At step 6110, remote device 1200 receives the request.

Steps 6120, 6130, 6140, 6150, 6160, 6170 are similar to FIG. 8E steps 5020, 5030, 5040, 5050, 5060, 5070.

At step 6180, access application 1220 sends the results of the cryptographic operation to application 1510. At step 6330, application 1510 receives the results.

At step 6340, application 1510 determines whether the results are valid, that is, the results demonstrate that remote device 1200 possesses the user application cryptographic credentials. If not, application 1310 sends a USAGE DENIED message to remote device 1200. At step 6190, remote device 1200 receives the USAGE DENIED message, and must contact the domain administrator.

If the results demonstrate that remote device 1200 possesses the user application cryptographic credentials, then application 1510 proceeds to step 6350.

At step 6350, application responds to the request from remote device 1200 to use application 1510. If the user wants to continue, processing returns to step 6100.

Figure 1A:
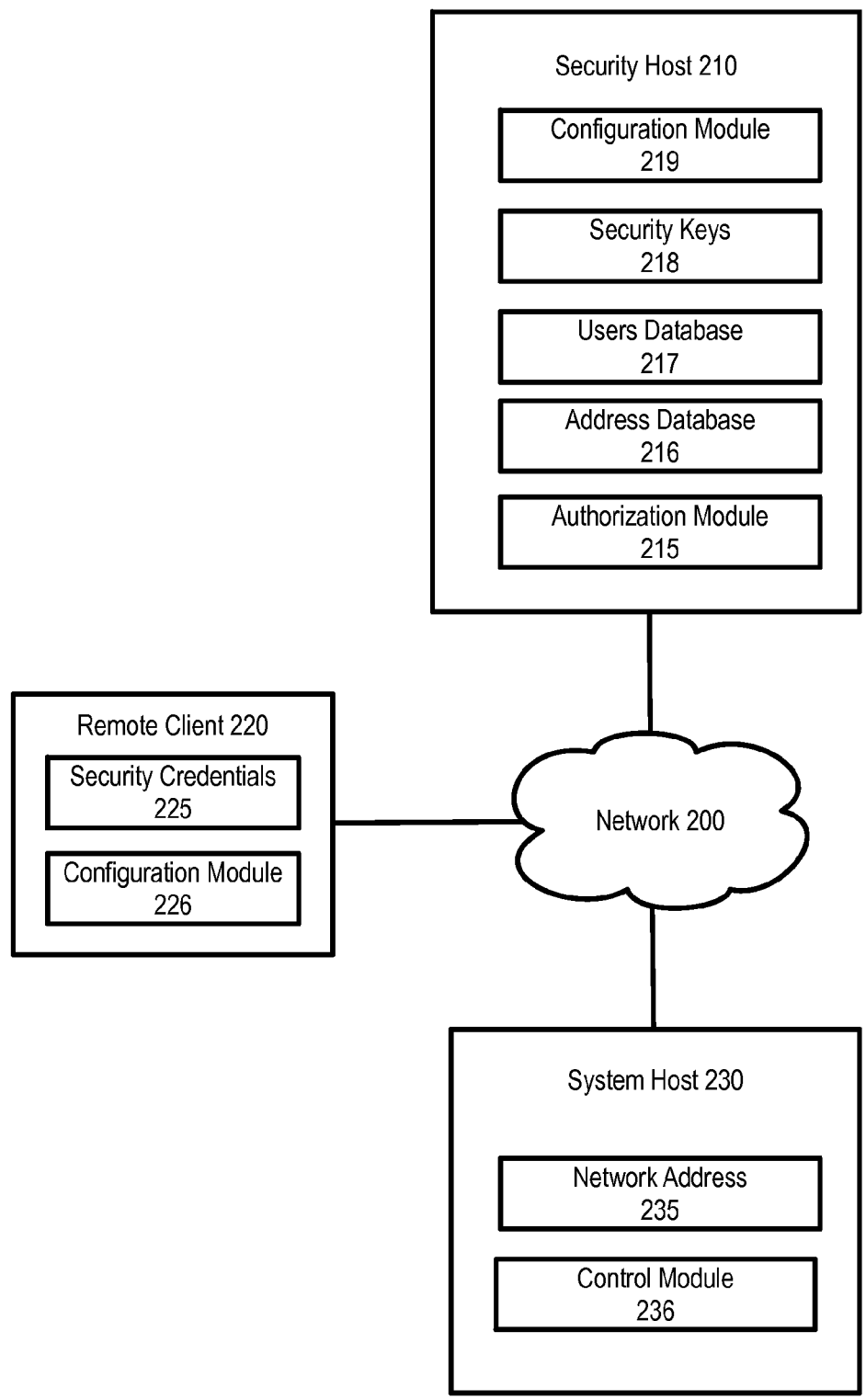
FIG. 1A is a block diagram showing a prior art configuration for enabling remote access to a host computer.
Figure 1B:
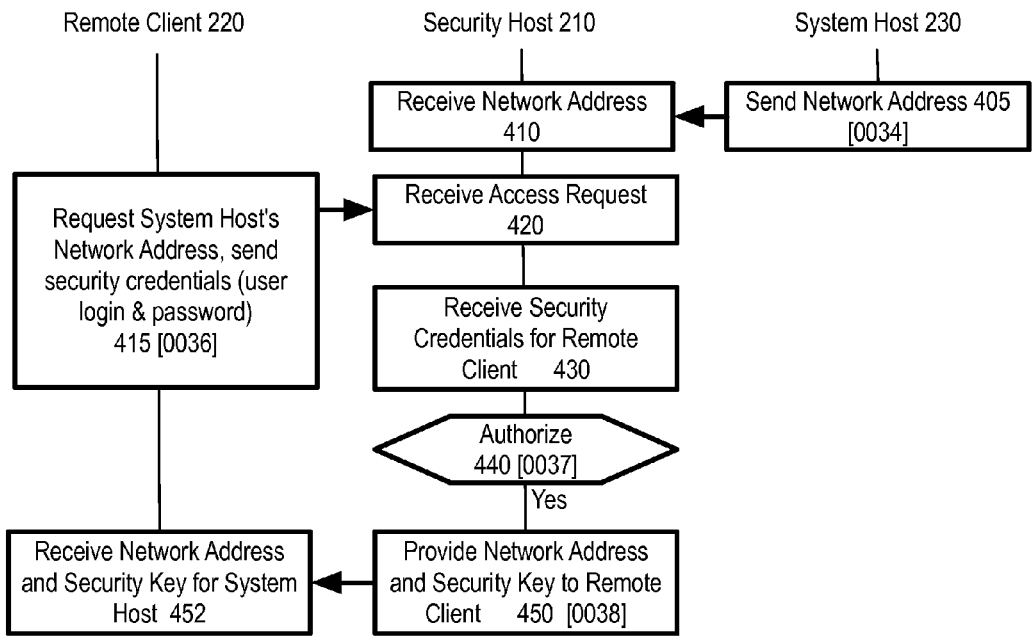
FIG. 1B is a flowchart showing a registration procedure for the configuration of FIG. 1A.
Figure 1C:
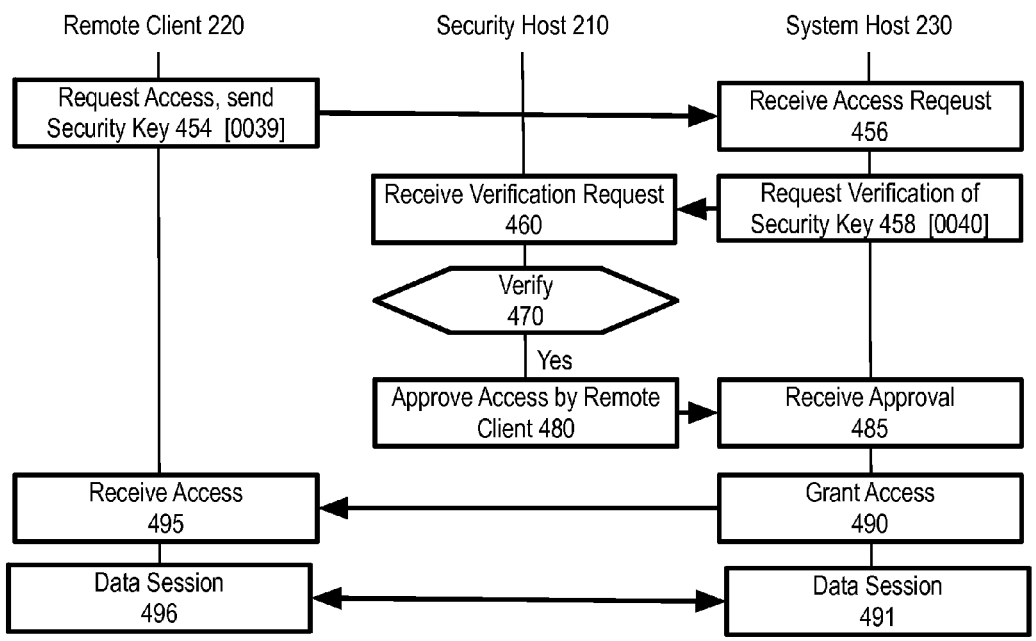
FIG. 1C is a flowchart showing an operational procedure for the configuration of FIG. 1A.
Figures 10A, 10B:
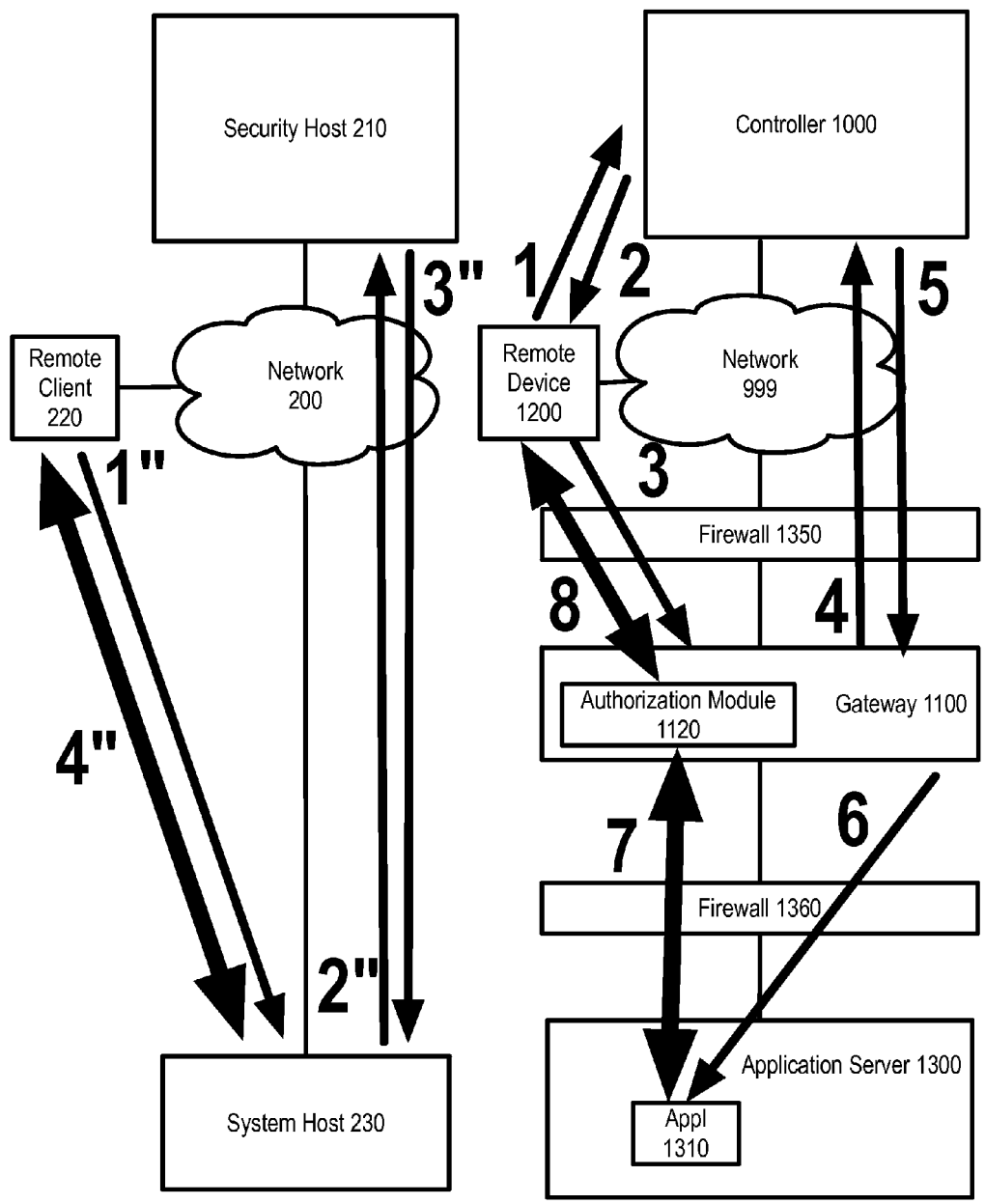
FIGS. 10A and 10B are block diagrams referred to in comparing the prior art configuration of FIG. 1A with the configuration in FIG. 2.

FIGS. 10A and 10B compare the prior art configuration of FIG. 1A with the configuration in FIG. 2. Differences include:

The prior art system host 230 is vulnerable to a hacking attack, since it can be directly accessed by any remote client via network 200. In contrast, since gateway 1100 functions first to determine whether an access request is authorized, and if so, to function as a proxy, application server 1300 is accessible, at most, indirectly, reducing vulnerability to a hacking attack;

Since a user is authorized to use only a particular application executing on application server 1300, the vulnerability of application server 1300 to a hacking attack is further reduced;

The prior art system host 230 is vulnerable to a distributed denial of service (DDoS) attack. While gateway 1100 is vulnerable to a DDoS attack, application server 1300 is protected from such an attack. In some embodiments (not shown), to enable operation even if gateway 1100 is crippled by a DDoS attack, application server 1300 is configured with two gateways, such as gateway 1101 and gateway 1102, and the application address list has the address of both gateways, so that if one is unavailable, the user can try the other automatically.

Other advantages of the configuration of FIG. 6B include:
even if one gateway is crippled, the controller can still function;
the controller is generally protected from a DDoS attack, since many gateways would have to be subject to DDoS attacks to percolate into a DDoS attack against the controller;
the remote device knows, at most, the addresses of the gateways that it is entitled to it does not know the universe of applications, nor does it necessarily know all of the gateway addresses;
the enterprise is not burdened with the management overhead of a virtual private network;
existing applications don't need to be modified, by placing the gateway 1102 they become protected instantly while in the prior art, the system host 320 would need to be re-programmed in order to interact with security host 210.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of enabling use of an application program, comprising:
    receiving, at a controller computer, a request from a user of a remote device for application entitlement;
    automatically sending, from the controller computer to the remote device, a list of application programs that the user of the remote device is entitled to use, and network addresses of gateway computers respectively associated with the application programs;
    sending, from the controller computer to the remote device, security data for one of: (i) establishing a secure communication channel with the controller computer, (ii) establishing a secure communication channel with one of the gateway computers, (iii) encrypting data stored at the remote device, and (iv) using with the application program;
    receiving, at one of the gateway computers, an application request from the user of the remote device for use of a selected application program, the application request being received after the security data has been sent;
    automatically creating, by the gateway computer, a request for verification that the user of the remote device is entitled to use the selected application program;
    automatically sending, from the gateway computer to the controller computer via a public communication network, the request for verification;
    receiving via the public communication network, at the gateway computer, a response from the controller computer indicating that the user of the remote device is entitled to use the selected application program;
    establishing, from the gateway computer to the selected application program executing on a computer other than the gateway computer or the controller computer, a secure channel;
    receiving, at the gateway computer, first data from the selected application program;
    automatically sending, from the gateway computer to the remote device, the first data from the selected application program;
    receiving, at the gateway computer, second data from the remote device; and
    automatically sending, from the gateway computer to the application program using the secure channel, the second data from the remote device,
    wherein the remote device always lacks a network address of the selected application program, and wherein the controller computer does not receive each of the application request, the first data and the second data.

2. A method of enabling secure use of an application program executing on an application server, comprising:
    sending, from a controller computer to a remote device, security data for one of: (i) establishing a secure communication channel with the controller computer, (ii) establishing a secure communication channel with a gateway computer, (iii) encrypting data stored at the remote device, and (iv) using with the application program;
    receiving, at the gateway computer located at the premises of the application server, an application request to access the application program, the request being from a remote device associated with a user, the application request being received after the security data has been sent;
    sending, via a public communication network, a request for access authorization for the user for the application program from the gateway computer to a controller computer located at a premises other than the premises of the application server;
    determining, at the gateway computer, that the user is authorized to access the application program based on a response from the controller computer to the gateway computer received via the public communication network;
    receiving, at the gateway computer, first data from the remote device and providing, from the gateway computer, the first data to the application program; and
    receiving, at the gateway computer, second data from the application program and providing, from the gateway computer, the second data to the remote device,
    wherein the controller computer does not receive each of the application request, the first data and the second data.

3. The method of claim 2, wherein the step of determining comprises:
    receiving, at the gateway computer from the controller computer, a list of applications that the user is authorized to access; and
    checking, at the gateway computer, that the application program is one of the applications on the list.

4. The method of claim 2, wherein the step of determining comprises:
    receiving, at the gateway computer from the controller computer, a notice that the user is authorized;
    sending, from the gateway computer to the controller computer, a request to check whether the user is authorized for the application program; and receiving, at the gateway computer from the controller computer, a notice that the user is authorized to access the application program.

5. The method of claim 2, further comprising, prior to the step of receiving the application program access request at the gateway computer, establishing a secure channel between the gateway computer and the remote device.

6. The method of claim 2, further comprising, prior to the step of sending a request for access authorization from the gateway computer to the controller computer, establishing a secure channel between the gateway computer and the controller computer.

7. The method of claim 2, further comprising, prior to the step of providing the received remote device data from the gateway computer to the application program, establishing a secure channel between the gateway computer and the application program.

8. The method of claim 2, further comprising, prior to the step of receiving the application program access request at the gateway computer, sending, from the controller computer to the remote device, a list of applications that the remote device is authorized to access and a respective network address of a gateway computer associated with each of the applications.

9. The method of claim 8, wherein the list is sent in response to an access request, from the remote device to the controller computer, to access the application program.

10. The method of claim 9, wherein the access request from the remote device to the controller computer includes a hardware identification of the remote device, and further comprising checking, by the controller computer, the hardware identification prior to sending the list of applications.

11. The method of claim 8, wherein the list is sent during registration of the remote device with the controller computer.

12. The method of claim 8, further comprising, prior to the step of sending a list of applications from the controller computer to the remote device, establishing a secure channel between the controller computer and the remote device.

13. The method of claim 2, wherein the security data is for a single usage session.

14. The method of claim 2, wherein the security data is for multiple usage sessions.

15. The method of claim 2, further comprising retrieving, by the controller computer, the security data from a data storage at the controller computer, prior to sending the security data from the controller computer to the remote device.

16. The method of claim 2, further comprising receiving, by the controller computer, the security data from the gateway computer, prior to sending the security data from the controller computer to the remote device.

17. The method of claim 16, wherein the security data is stored in a data storage at the gateway computer.

18. The method of claim 2, further comprising, prior to receiving, at the gateway computer, the application request:
sending, from the controller computer to the remote device, an instruction for the remote device to request security data from the gateway computer for one of: (i) establishing a secure communication channel with the controller computer, (ii) establishing a secure communication channel with the gateway computer, (iii) encrypting data stored at the remote device, and (iv) using with the application program; and
sending, from the gateway computer to the remote device, the security data in response to a request from the remote device to the gateway computer for the security data.

19. The method of claim 18, wherein the security data is stored in a data storage at the gateway computer.

* * * * *